United States Patent [19]

Koike et al.

[11] Patent Number: 5,796,458
[45] Date of Patent: Aug. 18, 1998

[54] ELEMENT DIVISION LIQUID CRYSTAL DISPLAY DEVICE AND ITS MANUFACTURING METHOD

[75] Inventors: Yoshio Koike; Tsuyoshi Kamada; Syun Tsuyuki; Noriaki Furukawa; Shigeru Masuda; Satoshi Murata; Tadashi Hasegawa; Takashi Sasabayashi; Seiji Tanuma; Takatoshi Mayama; Katufumi Ohmuro, all of Kawasaki, Japan

[73] Assignee: Fujitsu Limited, Kawasaki, Japan

[21] Appl. No.: 593,380

[22] Filed: Jan. 29, 1996

Related U.S. Application Data

[63] Continuation of Ser. No. 115,129, Sep. 1, 1993, abandoned, which is a continuation of Ser. No. 993,390, Dec. 18, 1992, Pat. No. 5,473,455.

[30] Foreign Application Priority Data

| Sep. 1, 1992 | [JP] | Japan | 4-233689 |
| Sep. 2, 1992 | [JP] | Japan | 4-234798 |
| Dec. 4, 1992 | [JP] | Japan | 4-324559 |
| Aug. 27, 1993 | [JP] | Japan | 5-212722 |

[51] Int. Cl.$^6$ .......................... G02F 1/1337
[52] U.S. Cl. .......................... 349/126; 349/124; 349/129
[58] Field of Search .......................... 359/76, 78; 349/124, 349/126, 129

[56] References Cited

U.S. PATENT DOCUMENTS

| 4,247,174 | 1/1981 | Walter | 359/76 |
| 4,496,220 | 1/1985 | Goscianski | 359/76 |
| 5,128,788 | 7/1992 | Takatoh et al. | 359/76 |
| 5,223,963 | 6/1993 | Okada et al. | 359/76 |
| 5,280,375 | 1/1994 | Tsuda et al. | 359/76 |
| 5,303,076 | 4/1994 | Okada et al. | 359/78 |
| 5,473,455 | 12/1995 | Koike et al. | 359/76 |
| 5,504,604 | 4/1996 | Takatori et al. | 359/78 |

FOREIGN PATENT DOCUMENTS

| 3234074 | 3/1984 | Germany | 359/76 |
| 54-005754 | 1/1979 | Japan | |
| 56-138714 | 10/1981 | Japan | 359/76 |
| 68-125012 | 7/1983 | Japan | 359/76 |
| 60-98419 | 6/1985 | Japan | 359/76 |
| 63-267724 | 11/1987 | Japan | |
| 63-106624 | 5/1988 | Japan | |
| 5-142544 | 6/1993 | Japan | 359/76 |
| 5-210099 | 8/1993 | Japan | |

OTHER PUBLICATIONS

Dubois et al., "Liquid–Crystal Orientation Induced by Polymeric Surfaces", *Journal of Applied Physics*, vol. 47, No. 4, Apr. 1976, pp. 1270–1274.

U.S. application No. 07/993,390, Koike et al., filed Dec. 18, 1992.

IBM Technical Disclosure Bulletin, vol. 33, No. 1B (Jun. 1990), "Controlled Two–and Four–Domain Twisted Nematic Liquid Crystal Displays".

Kaneko et al., "Wide–Viewing–Angle Improvements for AMLCDs", SID 93 Digest, pp. 265–268 (1993).

*Primary Examiner*—Anita Pellman Gross
*Attorney, Agent, or Firm*—Staas & Halsey

[57] ABSTRACT

An element division liquid crystal display device with a liquid crystal inserted between first and second plates having alignment films, respectively. The alignment film of at least the first plate includes a single layer of alignment material having a plurality of first and second adjacent domains A and B and is continuously rubbed in one direction through first and second minute domains A and B. A further treatment, different from a rubbing treatment, is effected to the single alignment layer so that a pretilt angle of the liquid crystal contacting the alignment layer at one of the first and second domains is different from the pretilt angle of the liquid crystal contacting the alignment layer at the other domain. The further treatment includes one of the steps of irradiating with UV light, changing the chemical components of the material of the alignment layer, heating or changing the precuring process.

38 Claims, 31 Drawing Sheets

$\alpha > \beta > \gamma$ 52p  51  21  16

52  51  21  16

ELEMENT DIVISION LIQUID CRYSTAL DISPLAY DEVICE AND ITS MANUFACTURING METHOD

This application is a continuation Ser. No. 08/115,129, filed Sep. 1, 1993, now abandoned, which is further a continuation of application Ser. No. 07/993,390, filed Dec. 18, 1992, now U.S. Pat. No. 5,473,455.

BACKGROUND OF THE INVENTION

1. Field of the Invention

This invention relates to a liquid crystal display device having different liquid crystal aligning domains in each element of the display.

2. Description of the Related Art

A liquid crystal display device comprises a liquid crystal display panel including a liquid crystal inserted between a pair of transparent glass plates. One of the plates is provided on its inner surface with a common electrode and an alignment film, and the other plate is provided on its inner surface with pixel electrodes (element electrodes) and an alignment film. Recently, an active matrix drive circuit together with the pixel electrodes is often formed on one of the plates. In addition, polarizers (one of which is an analyzer) are arranged on the outside of these plates, respectively. Usually, the polarizers are arranged so that the polarized-light-transmitting axes thereof cross at right angles to each other (normally white mode). Although the present invention is described below with reference to this normal-white mode, it is also possible that the present invention is applicable to a normally-black mode (when the polarized-light transmitting axes thereof are parallel to each other) with respect to technically identical matters.

In the liquid crystal display panel, molecules of the liquid crystal are aligned with predetermined pretilts in accordance with the rubbing directions of the alignment films in both plates. In the twisted-nematic liquid crystal display device, the rubbing directions of the alignment films in both plates are almost perpendicular to each other, and the molecules of the liquid crystal helically twist from one of the plates to the other plate. Thus, when voltage is not applied to the liquid crystal, the molecules of the liquid crystal are maintained in the initial twisted condition with the initial pretilt, and so the incident light rotatingly propagates through the liquid crystal along the twist thereof and then is emitted from the liquid crystal display panel. In this case, a white spot is obtained in a normally white mode in which the polarizers are arranged at right angle to each other. When voltage is applied, the molecules of the liquid crystal rise (tilt), and the birefringence action of the liquid crystal becomes weak and the above rotation of the polarized light becomes weak, so that it becomes difficult for the incident light to transmit through the liquid crystal display panel and a black spot is obtained. In this way, it is possible to form an entire image on the display, having a contrast between brightness and darkness, by controlling the voltage applied to the liquid crystal.

In the liquid crystal display device, the contrast between brightness and darkness in the image varies with the position of the observer. This is generally recognized as a characteristic of a viewing angle of the liquid crystal display device. For example, a clear image with a good contrast can be seen when the observer views the liquid crystal display device from the front, normal to the display, but the contrast of the image will be reduced when the same image is viewed obliquely, at an angle of 30° to the normal direction, from above or below. The image may appear whitish, when the display is viewed obliquely from above but may have too much contrast when viewed obliquely from below when the voltage applied to the liquid crystal is low. However, the higher the voltage, the lower the contrast and this causes problems when an intermediate color is required.

To solve such an influence on the characteristics of the viewing angle, it has been proposed, in Japanese Unexamined Patent Publications (Kokai) No. 54-5754 and No. 63-106624, that each element (one pixel region) be divided into two minute domains in which the alignment directions of the liquid crystal are different from each other (hereinafter referred to as an element division or an alignment division); rubbing is effected in one direction in one of the two domains, and rubbing is effected in another direction in the other domain. With this element division, it is possible to average the two different viewing angle characteristics so that the overall viewing angle characteristic can be improved.

In the element divided liquid crystal display device, it is necessary to effect a rubbing treatment for each of the two minute domains (in one direction and then in the other direction). Such rubbing treatments can be made twice for each domain by use of a photolithographic technique as described below. The first rubbing treatment comprises the steps of applying an alignment film on an inner surface of the plate, applying a photo-resist to the alignment film, forming minute openings in the resist in correspondence with one of the two domains by a photolithographic technique, rubbing the alignment film with the resist by a rubbing roller in one direction, and then removing the resist from the alignment film. The second rubbing treatment comprises the steps of applying a photo-resist to the once rubbed alignment film, forming minute openings in the resist in correspondence with the other domain by a photolithographic technique, rubbing the alignment film by the rubbing roller in another direction, and removing the resist from the alignment film.

In such a rubbing treatment, it is necessary to repeat two photolithographic operations and two rubbing operations on the alignment film of each plate, respectively. This means that a total of four photolithographic operations and four rubbing operations are necessary for two plates.

Therefore, since a number of photolithographic operations and rubbing operations are needed, a problem arises in that the cost for manufacturing the pixel divided liquid crystal display device increases, the rubbed alignment films can be damaged and the alignment of the liquid crystal becomes unstable.

To solve these problems, the assignee of the present invention has proposed, in previous applications, that the element division of the alignment film of each plate can be realized, using only one rubbing process, by adequately controlling the pretilt angle of the liquid crystal. In the most simplified process, the alignment film in one of the plates is formed as a solid and rubbed in a manner so that a pretilt angle of a certain value β can be obtained, while the alignment film in the other plate is formed in a two layered structure, the upper alignment layer of which is provided with openings in correspondence with the one of the above described element domains. The rubbing is effected on the upper alignment layer. For example, the materials of the lower and upper layers are different, so that when the rubbing is effected in an identical manner, the pretilt angle of the liquid crystal in the upper alignment layer becomes α, and the pretilt angle of the liquid crystal in the lower alignment layer, exposed by the openings in the upper alignment layer, becomes γ. The pretilt angles satisfy the relationship of α>β>γ. Here, one rubbing operation means that the rubbing roller is moved a plurality of times in one direction. How the element division can be realized by this arrangement will be described in detail below.

As described above, it is possible to realize the element division by forming two minute domains in which pretilt angles α and γ are different from each other with respect to at least one of the plates. This is advantageous in that the manufacturing steps can be simplified, that the rubbed alignment films are not damaged, and that the alignment condition of the liquid crystal becomes stable. In the previous applications, however, the alignment film of the element division is formed in a two-layer structure.

SUMMARY OF THE INVENTION

It is therefore an object of the present invention to provide a liquid crystal display device and a manufacturing method thereof which enable the use of a single layered alignment film having two minute domains in which the pretilt angles of the liquid crystal contacting the single layered alignment film are different from each other in two minute domains to realize an element division.

Another object of the present invention is to provide a liquid crystal display device which includes a two layered alignment film comprising lower and upper alignment layers and in which the upper alignment layer is appropriately arranged relative to bus lines in an active matrix drive circuit.

According to the present invention, there is provided a liquid crystal display device comprising: a first plate having an alignment film; a second plate opposed to the first plate and having an alignment film; a liquid crystal inserted between the first and second plates; the alignment film on at least the first plate comprising a single layer of alignment material having adjacent first and second minute domains; the single alignment layer being continuously rubbed in one direction through the first and second minute domains; and a further treatment different from a rubbing treatment being effected to the single alignment layer so that the pretilt angle of the liquid crystal contacting the alignment layer at one of the first and second minute domains is different from the pretilt angle of the liquid crystal contacting the alignment layer at the other domain.

In a method for manufacturing such a liquid crystal display device, a further treatment, different from the rubbing treatment, to enable the pretilt angles α and γ to form different minute domains comprises the step of selectively irradiating the alignment layer at the first and second domains with ultraviolet light.

Further, the further treatment different from the rubbing treatment comprises the step of selectively changing the distribution of chemical components mainly controlling the pretilt angles on the surface of the first and second domains.

Still further, the further treatment, different from the rubbing treatment, comprises the step of selectively heating the alignment layer at the first and second domains.

In this arrangement, the alignment film of the first plate has adjacent first and second minute domains in which the alignment direction of the liquid crystal is the same but the pretilt angles α and γ thereof are different from each other. Regarding the alignment film of the second plate, for example, the alignment direction and pretilt angle β of the liquid crystal may be substantially the same in the first and second adjacent minute domains and there is the relationship of α>β>γ. In addition, in the above construction, each of the alignment films of the first and second plates comprises a single layered film and the construction is simpler than that of the previous liquid crystal display device. Alternatively, regarding the alignment film of the second plate, it can be arranged such that the alignment direction of the liquid crystal is the same, but the pretilt angles α and γ are different from each other in the first and second adjacent minute domains.

When there is the relationship α>β>γ in the first liquid crystal aligning domain, the pretilt angle of the liquid crystal contacting the first plate becomes α, while the pretilt angle of the liquid crystal contacting the second plate becomes β. In the second liquid crystal aligning domain, the pretilt angle of the liquid crystal contacting the first plate becomes γ, while the pretilt angle of the liquid crystal contacting the second plate becomes β. When the voltage is applied to the liquid crystal, molecules of the liquid crystal located intermediately between the first and second plates tend to rise depending on the larger pretilt angle of the first and second plates. Intermediate molecules in the first liquid crystal aligning domain thus rise (tilt) depending on the direction of the liquid crystal contacting the first plate, while intermediate molecules in the second liquid crystal aligning domain B rise (tilt) in accordance with the direction of the liquid crystal contacting the second plate, and thus the element division can be attained.

BRIEF DESCRIPTION OF THE DRAWINGS

The above and other objects, features, and advantages of the invention will become more apparent from the following description when considered in conjunction with the accompanying drawings, in which.

DESCRIPTION OF THE PREFERRED EMBODIMENTS

Figure 1:
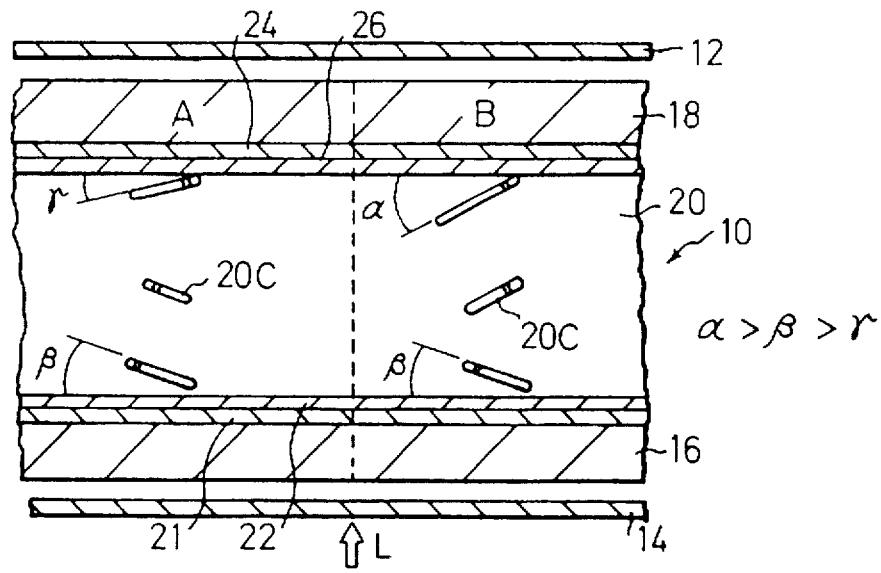
FIG. 1 is a cross-sectional view of a liquid crystal display device according to the present invention.

FIG. 1 is a view illustrating a liquid crystal panel 10 of a liquid crystal display device according to the first embodiment of the present invention. Polarizers 12 and 14 are arranged on either side of the liquid crystal panel 10 perpendicular to each other in the normally white mode, or parallel to each other in the normally black mode.

The liquid crystal panel 10 comprises a pair of transparent glass plates 16 and 18 and a liquid crystal 20 inserted between the glass plates 16 and 18. In the embodiment, a light from a source (not shown) is incident to the liquid crystal panel 10 from one of the glass plates 16 and 18, as shown by the arrow L, and particularly plate 16 and an observer views the liquid crystal panel 10 from the side opposite the incident light. In the description below, the glass plate 16 on the light incident side is called a lower glass plate, and the glass plate 18 on the observer side is called an upper glass plate. It is, of course, possible to reverse the light incident side and the observer side.

A common electrode 21 made of ITO and an alignment film 22 are arranged on the inner surface of the lower glass plate 16, and a plurality of element electrodes 24 and an alignment film 26 are arranged on the inner surface of the upper glass plate 18. A color filter layer (not shown) is provided under the common electrode 21 of the lower glass plate 16. It is also possible to reverse the common electrode 21 and the element electrodes 24.

Figure 2:
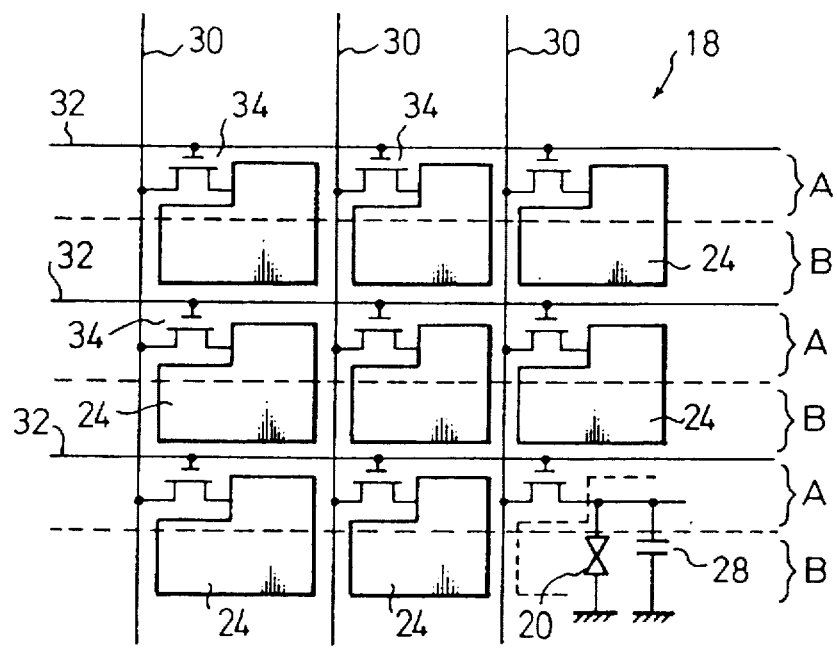
FIG. 2 is a view illustrating an arrangement of element electrodes of FIG. 1.

As shown in FIG. 2, the element electrodes 24 of the upper glass plate 18 are connected to an active matrix circuit. The active matrix circuit comprises data bus lines 30 and gate bus lines 32 extending vertically and horizontally in a matrix, and the element electrodes 24 are connected to the data bus lines 30 and the gate bus lines 32 via thin-film transistors (TFTs) 34, respectively.

As shown in FIG. 2, each pixel region represented by one of the element electrodes 24 is further divided into two minute domains A and B. The division pattern shown in FIG. 2 is formed by a line passing through the center of a row of pixel electrodes 24, but it is also possible to form these minute domains A and B in a zigzag pattern on a row of the element electrodes 24.

The twisted-nematic liquid crystal is used here. For an easier understanding of the present invention, a basic feature of the rubbing treatment and the alignment division established thereby will be described with reference to FIGS. 18 through 24.

Figure 18:
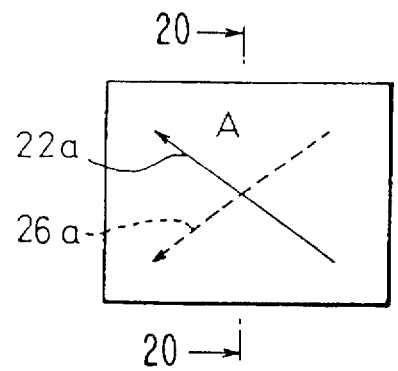
FIG. 18 is a view illustrating a rubbing treatment of the twisted-nematic liquid crystal.

FIG. 18 shows an example of a rubbing treatment when the twisted-nematic liquid crystal (without the alignment division) is used. An arrow 22a illustrates the direction of rubbing the alignment film 22 of the lower glass plate 16, while a dotted-line arrow 26a illustrates the direction of rubbing the alignment film 26 of the upper glass plate 18.

Figure 19:
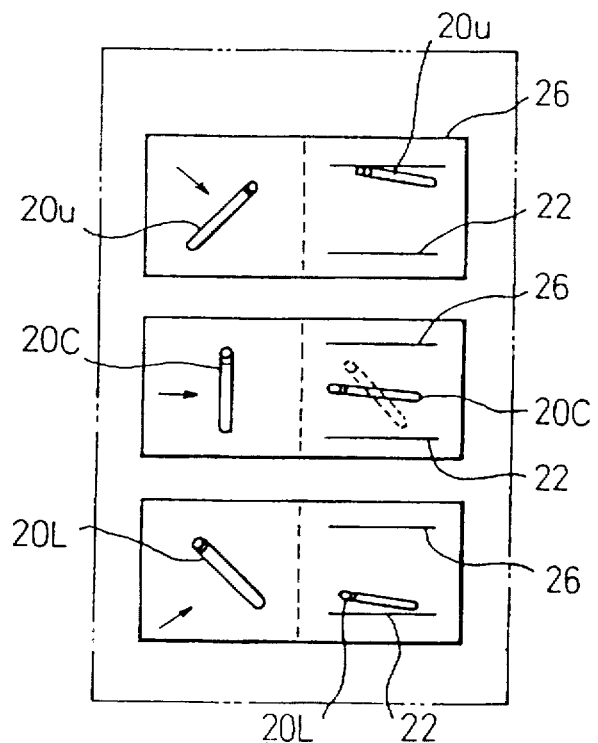
FIG. 19 is a view illustrating the alignment of molecules of the liquid crystal of FIG. 18.

FIG. 19 separately shows the lower molecules of the liquid crystal 20L contacting the alignment film 22 of the lower plate 16, the upper molecules of the liquid crystal 20U contacting the alignment film 26 of the upper plate 18, and the intermediate molecules of the liquid crystal 20C located between the lower and upper plates 16 and 18 when the rubbing treatment of FIG. 18 is performed. In FIG. 19, the Figures on the left side show the plan views of the molecules, viewed from the upper glass plate 18, and the Figures on the right side show the elevational cross-sectional views of the molecules, viewed from the direction of the arrows in the plan views, respectively. The alignment direction, of the lower liquid crystal molecules 20L which contact the alignment film 22 of the lower plate 16, corresponds to the rubbing direction 22a of the alignment film 22 of the lower plate 16. The alignment direction, of the upper molecules 20U which contact the alignment film 26 of the upper plate 18, corresponds to the rubbing direction 26a of the alignment film 26 of the upper plate 18. The liquid crystal twists or rotates in the left turning direction in the embodiment between the lower plate 16 and the upper plate 18, and the intermediate molecules 20C are uniformly aligned.

Figure 20:
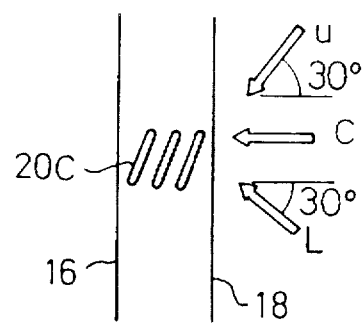
FIG. 20 is a cross-sectional view taken along the line 20—20 in FIG. 18.

FIG. 20 is a cross-sectional view of the liquid crystal panel 10 of FIG. 18 after the rubbing treatment, taken along the line 20—20 in FIG. 18. Arrow C shows that the observer views the vertical liquid crystal panel 10 from the normal to the upper glass plate 18. Arrow U shows that the observer views the liquid crystal panel 10 obliquely at an angle of 30° from above relative to the normal and the arrow L shows that the observer views the liquid crystal panel 10 obliquely at an angle of 30° from below relative to the normal.

Figure 21:
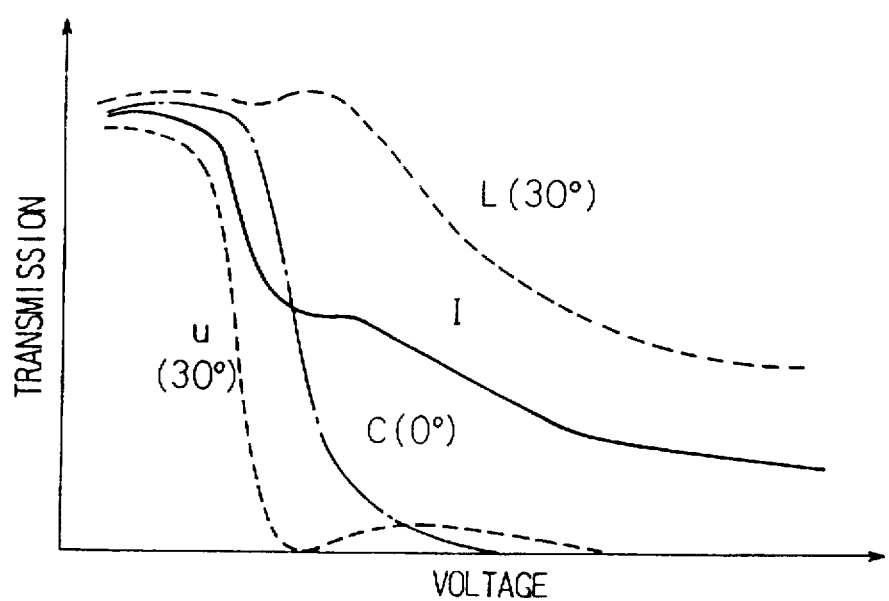
FIG. 21 is a view illustrating characteristics of the viewing angle of the twisted-nematic liquid crystal display device.

FIG. 21 is a view illustrating characteristics of the viewing angle of the liquid crystal panel 10 to which the rubbing treatment of FIG. 18 is carried out. The line C shows the characteristic curve of voltage versus transmittance when viewed from the arrow C of FIG. 20. The lines U and L show the characteristic curves of voltage versus transmittance when viewed from the arrows U and L of FIG. 20, respectively. In the case of the line L, the decrease of transmittance is small while a voltage applied to the liquid crystal increases, and the display is relatively bright even when a black or gray spot is desired. In the case of the broken line U, the transmittance decreases considerably, even at low voltages, and the contrast of the image is great. However, as the voltage increases beyond a certain point, the transmittance becomes high and the relationship between voltage and the transmittance is reversed. Thus, it is difficult to produce an intermediate color between black and white.

Figure 22:
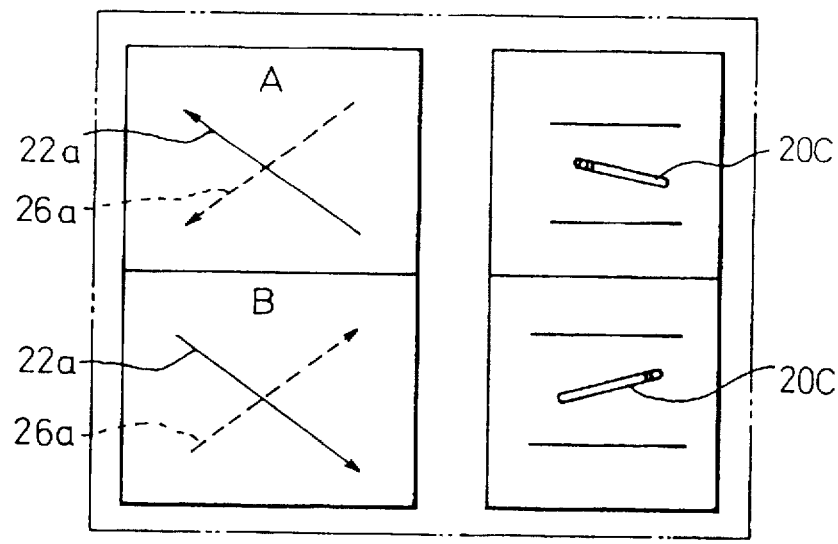
FIG. 22 is a view illustrating a basic form of the element division.

To improve these characteristics of the viewing angle, element division is carried out as shown in FIG. 22.

FIG. 22 shows a basic form of element division which has minute domains A and B. The rubbing treatment is carried out on the minute domain A as shown in FIG. 18, while on the minute domain B the rubbing treatment is made in the reverse manner. That is, the direction of the arrow 26a in the minute domain B is opposite to the direction of the arrow 26a in the domain A, while the direction of arrow 22a in the domain B is also opposite to the arrow 22a in the domain A. As a result, the direction of the intermediate molecules 20C of the liquid crystal located intermediately between the lower plate 16 and the upper plate 18 in the minute domain B is opposite to that in the domain A, and thus the viewing angle characteristic is also reversed.

When the minute domains A and B are arranged adjacent to each other and the observer views the liquid crystal panel 10 from the direction of arrows U or L of FIG. 20, the characteristic shown by the solid line I of FIG. 21 is obtained. The characteristic of the solid line I can be obtained by averaging the two characteristics of the broken lines L and U and becomes close to that of the dotted chain line C when viewed from the normal to the liquid crystal panel. It is therefore possible to improve the characteristic of the viewing angle by eliminating two extremely high or low transmission viewing directions. This is the effect of element division. It is, however, necessary to effect two rubbing operations for each of the plates as described above, to establish the rubbing treatment of FIG. 22. As this is troublesome, the assignee of this invention has proposed in the previous application an example of the alignment treatment as shown in FIGS. 23 and 24 of the present application.

Figure 23:
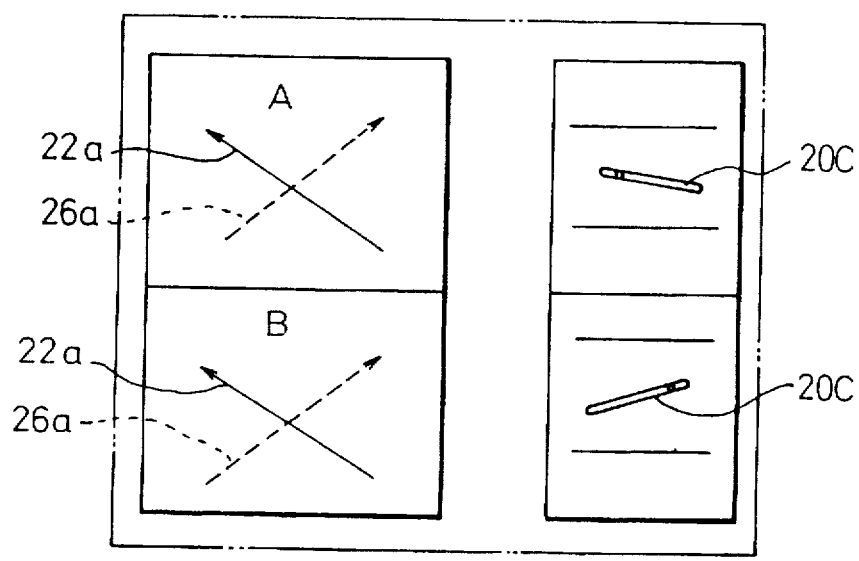
FIG. 23 is a view illustrating an improved form of the element division.

In FIG. 23, the rubbing treatment of the domain A is the same as that of the domain B. That is, the rubbing can be carried out only in the direction of arrow 22a on both domains A and B of alignment film 22 of the lower plate 16. For the alignment film 26 of the upper plate 18, the rubbing can only be carried out on both domains A and B in the direction of arrow 26a. It is, however, necessary to control the pretilt angles of the liquid crystal as shown in FIG. 24.

Figure 24:
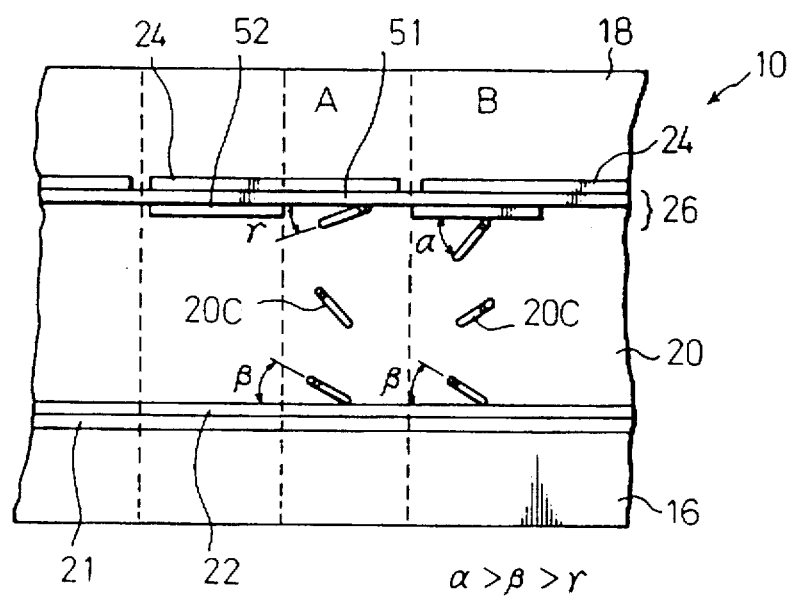
FIG. 24 is a view illustrating the liquid crystal display device in the previous application.

In FIG. 24, the alignment film 22 of the lower plate 16 comprises a single layer structure and is arranged such that the pretilt angle of the liquid crystal contacting the rubbed alignment film 22 becomes β. The alignment film 26 of the upper plate 18 comprises two layers comprising a lower alignment film 51 and an upper alignment film 52. The upper alignment film 52 is patterned so as to have openings corresponding to one of the minute domains A and B. The upper alignment film 52 is made from a material which may present a relatively high pretilt angle α of the liquid crystal when rubbing is carried out. The lower alignment film 51 is made of a material which may present a relatively low pretilt angle γ of the liquid crystal after rubbing is carried out. The relationship is α>β>γ.

In the domain A, the pretilt angle of the liquid crystal molecules on the side of the lower plate 16 is β and the pretilt angle of the liquid crystal molecules on the side of the upper plate 18 is γ with the relationship β>γ. In the domain B, the pretilt angle of the liquid crystal molecules on the side of the lower plate 16 is β, while the pretilt angle of the liquid crystal molecules on the side of the upper plate 18 is α, with the relationship α>β.

The inventors of the previous application have found that when there is a difference in the pretilt angles between the alignment films of the upper and lower plates, the intermediate molecules between lower and upper plates tend to rise (tilt) in accordance with the rubbing treatments producing the larger pretilt angle when voltage is applied. It is generally known that light transmittance in the liquid crystal is mainly determined by the behavior of the intermediate molecules of the liquid crystal.

Accordingly, in FIG. 24, the intermediate molecules 20C of the liquid crystal in the minute domain A rise in accordance with the rubbing direction of the alignment film 22 on the lower plate 16. The rubbing direction of the alignment film 22 on the lower plate 16 corresponds to the rubbing direction in the domain A in FIG. 23. This means that the characteristic of the viewing angle in the domain A in FIGS. 23 and 24 is same as that in the domain A in FIG. 22.

Similarly, the intermediate molecules 20C of the liquid crystal in the domain B in FIG. 24 are aligned along the rubbing direction of the alignment film 26 of the upper plate 18. The rubbing direction of the alignment film 26 of the upper plate 18 in FIG. 24 corresponds to the rubbing direction 26a in FIG. 23 and it is the same direction as that in the domain B in FIG. 22. This means that the viewing angle characteristic in the domain B in FIGS. 23 and 24 is the same as that in the domain B in FIG. 22. That is, by the treatment shown in FIGS. 23 and 24, it is possible to attain the same effect of the pixel division as that in FIG. 22. Therefore, the advantage is that it is necessary to carry out one rubbing operation for each of the plates, as seen in FIGS. 23 and 24 and this leads to a simple manufacturing process and a stable alignment of the liquid crystal.

The present invention is intended to improve this previous application, by making it possible to form the alignment film 26 of the upper plate 18 in a single layer structure which realizes the pretilt angles γ and α for the domains A and B, as shown in FIG. 1.

Figure 32:
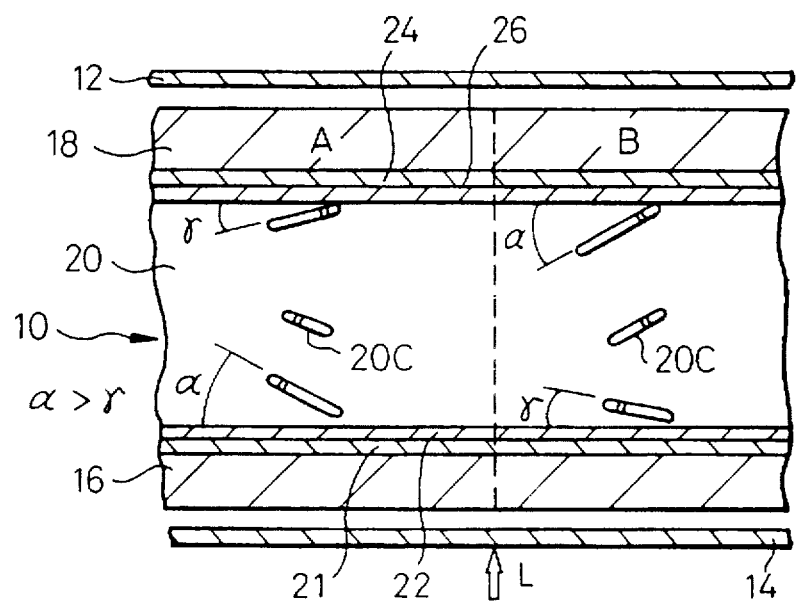
FIG. 32 is a view illustrating a modification to FIG. 1.

Further, as shown in FIG. 32, it is possible to make each of the alignment films 26 and 22 of the upper and lower plates 18 and 16 in a single layer structure so that the different pretilt angles γ and α can be formed in each of the domains A and B. The pretilt angles α and γ are arranged to be opposite to each other.

According to the present invention, a single layer alignment film 26 is continuously rubbed one way over the two domains A and B, as shown in FIG. 23, and a further treatment, which is different from the rubbing treatment, is effected to cause the different pretilt angles α and γ of the liquid crystal contacting the alignment film 26 at the domains A and B.

Figure 3A:
FIGS. 3A to 3D are views illustrating the steps of changing the pretilt of the liquid crystal according to the first embodiment of the present invention.

FIG. 3A is a view illustrating the first embodiment for selectively changing the pretilt angles α, γ of the liquid crystal of the alignment film 26 of the upper plate 18, as means for the above described further treatment.

In FIG. 3A, the alignment film 26 is applied to the surface of the upper plate 18 by spin-coating or offset printing. If the element electrodes 24 or the like are formed on the upper plate 18, the application of the alignment film 26 to the surface of the upper plate 18 means that the alignment film 26 is applied to the upper plate 18 having the element electrodes 24 or the like formed thereon. In this case, the alignment film 26 is made from fully pre-imidized polyimide which presents a high pretilt angle. This type of polyimide is usually called soluble polyimide and made by dissolving polyimide components in solution. Polyimide components include chemical components such as diamine, which can control the pretilt angles. For example, alignment materials such as JALS 219 and JALS 214 sold by Japan Synthetic Rubber K.K. can be used for this purpose.

Figure 3B:

In FIG. 3B, the alignment film 26 of the upper plate 18 is cured in an oven or hot plate, to evaporate the solvent and to harden the film 26.

Figure 3C:
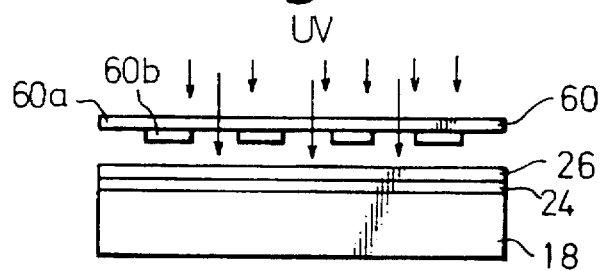

In FIG. 3C, ultraviolet light is selectively irradiated onto the alignment layer corresponding to the domains A and B by using a mask 60. The mask 60 comprises a plate 60a made of quartz or synthetic quartz which is transparent to UV light, and a layer of UV blocking material 60b, such as chromium, attached to the plate 60a in correspondence with a selected one of the domains A or B.

Figure 3D:

In FIG. 3D, the rubbing operation is carried out on the alignment film 26 by a rubbing roller 57, as described with reference to FIG. 23.

Figure 4A:
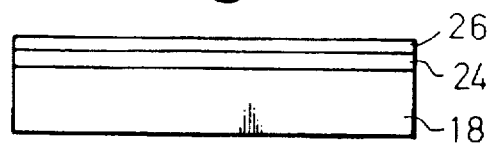
FIGS. 4A to 4D are views illustrating the steps of changing pretilt of the liquid crystal according to the second embodiment of the present invention.
Figure 4B:
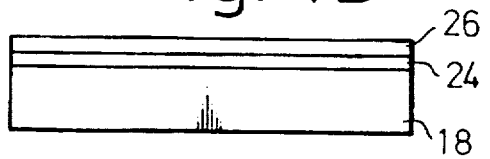
Figure 4C:
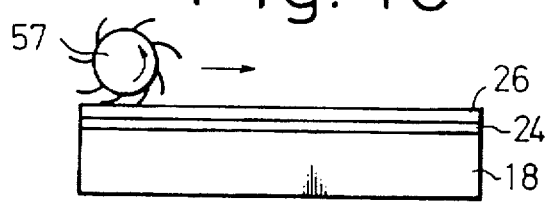
Figure 4D:
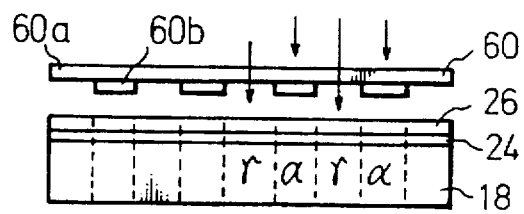

FIG. 4A is a view of the liquid crystal display device illustrating the second embodiment of further treatment in which pretilt angles α and γ of the liquid crystal at the alignment film 26 of the upper plate 18 is changed. In this embodiment, similarly to FIGS. 3A and 3B, the alignment film 26 is first applied to the surface of the upper plate 18, as shown in FIG. 4A, then the curing process is carried out on the alignment film 26 of the upper plate 18, as shown in FIG. 4B. Then, opposite to FIGS. 3C and 3D, the rubbing is effected on the alignment film 26, as shown in FIG. 4C, and UV light is selectively irradiated onto the minute domains A and B by using the mask 60, as shown in FIG. 4D.

In FIGS. 3A to 3D, and 4A to 4D, UV light is selectively irradiated for the minute liquid crystal domains A and B. The nonirradiated alignment layer, in the domains A, for example, tends to show a high pretilt angle α depending on the nature of the material comprising the polyimide used for the alignment film 26 and the degree of the rubbing treatment; in the irradiated domains B, the surface energy of the alignment film 26 increases and the pretilt angles thereof become smaller compared with that presented by the nonirradiated-polyimide and the rubbing treatment. Therefore, it is, for example, possible to make the pretilt angle α=8°, the pretilt angle β=4°, and the pretilt angle γ=1°.

Figure 5:
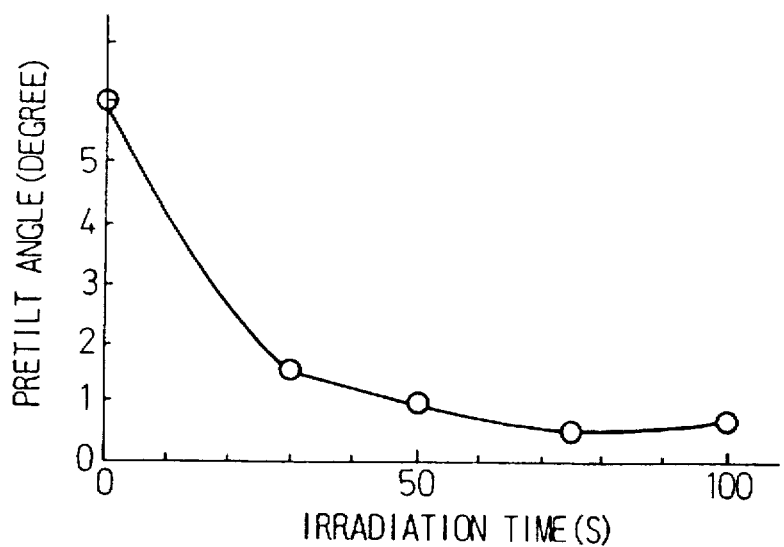
FIG. 5 is a views illustrating the relationship between UV irradiation time and the pretilt angle.
Figure 6:
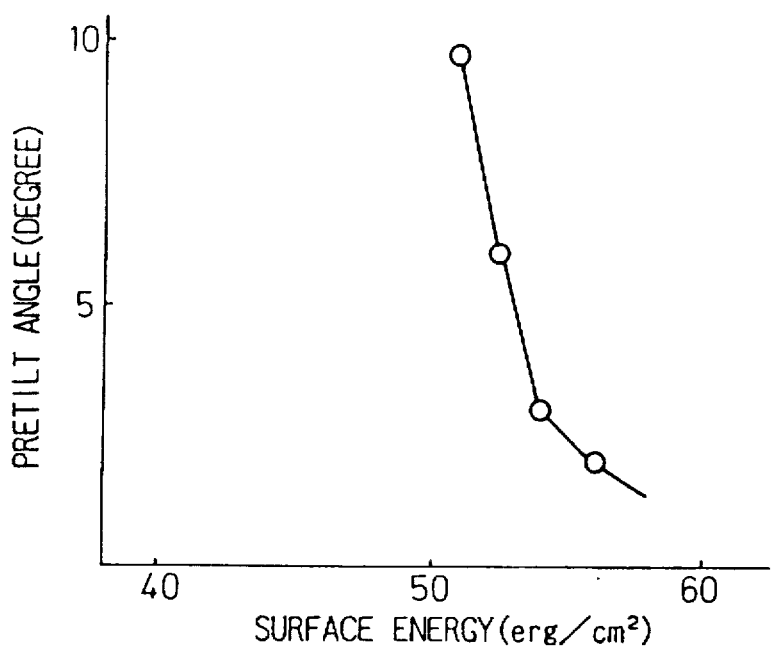
FIG. 6 is a view illustrating the relationship between surface energy and the pretilt angle.

It is shown in FIGS. 5 and 6 that the UV irradiation leads to a decrease in the pretilt angle γ. As shown in FIG. 5, the longer the UV irradiation time, the smaller the pretilt angles. The UV irradiation increases the surface energy of the alignment film 26, as shown in FIG. 6, such that the higher the surface energy of the alignment film 26 is, the better the wettability of the alignment film 26 becomes, the smaller the contact angle becomes, and the smaller the pretilt angle becomes. The experimental fact that the high surface energy causes a small pretilt angle will be used in the embodiment described below.

To reduce the pretilt angle by making use of UV irradiation, it is necessary to use UV light having a sufficient energy to disconnect the polyimide link on the surface of the alignment film 26. To do this, it is advisable to use UV light with wavelength less than 300 nm, preferably less than 260 nm. It is to be noted that, in the embodiment, a low pressure mercury lamp generating the UV light with mainly wavelengths of 253.7 nm and 184.9 nm, was used at 10 mW/cm$^2$.

Figures 7A, 7B:
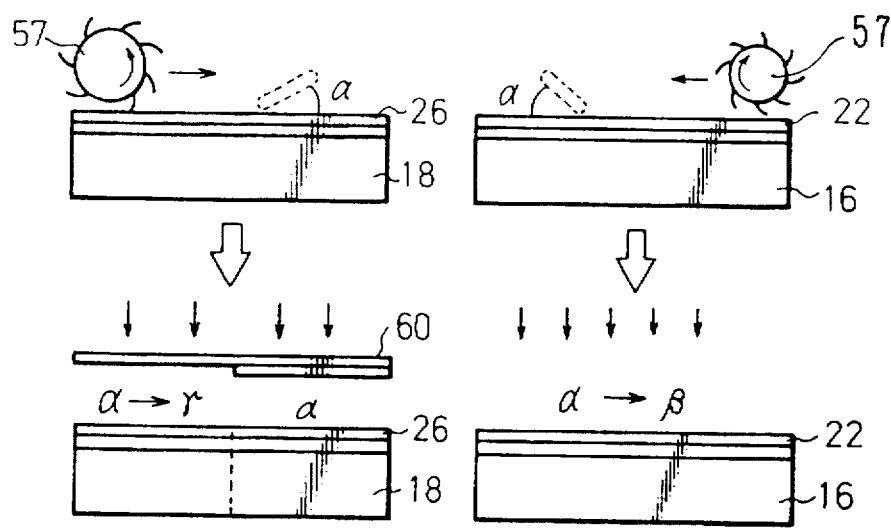
FIGS. 7A and 7B are views illustrating an example of manufacturing upper and lower plates of the liquid crystal display device.

FIGS. 7A and 7B are views illustrating a method to manufacture the combinations of the alignment film 26 of the upper plate 18 and the alignment film 22 on the lower plate 16, as shown in FIG. 1, with the help of the UV irradiation. In this embodiment, the same type of alignment material is used for both alignment films 26 and 22 on the upper and lower plates 18 and 16, respectively, so that the liquid crystal can show almost the same pretilt angles if an identical rubbing treatment is effected.

FIG. 7A shows an alignment process for the alignment film 26 of the upper plate 18 in which the rubbing treatment is carried out first on the surface of the alignment film 26 by the rubbing roller 57 so that the liquid crystal contacting the alignment film 26 can have the pretilt angle α. Next, UV light is irradiated on the alignment film 26 by using the mask 60. Pretilt angle α is maintained in the domain B which the UV radiation did not reach, while the pretilt angle γ is established in the minute domains A which the UV radiation reaches. The rubbing operation and the UV irradiation can be performed in the reverse order.

FIG. 7B shows an alignment process for the alignment film 22 on the lower plate 16, in which rubbing is carried out first on the surface of the alignment film 22 by the rubbing roller 57 so that the liquid crystal contacting the alignment film 22 can have the pretilt angle α. Next, UV light is irradiated without using a mask on the alignment film 22 to produce the pretilt angle β. It is, of course, possible to reverse the rubbing operation and the UV irradiation. In this way, the alignment film 22 and 26 satisfy the relationship of α>β>γ.

Figures 8A, 8B:
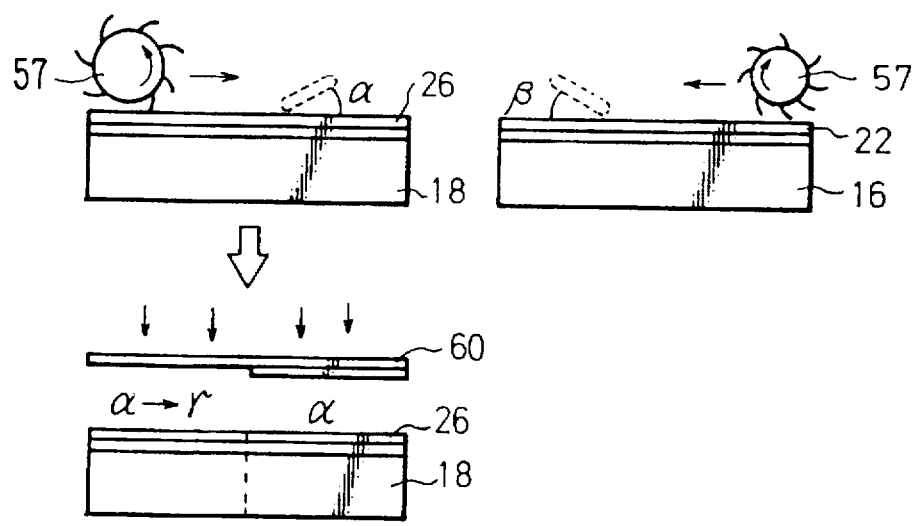
FIGS. 8A and 8B are views illustrating another example of manufacturing upper and lower plates of the liquid crystal display device.

FIGS. 8A and 8B show another embodiment illustrating the manufacture of the combination of the alignment film 26 on the upper plate 18 and the alignment film 22 on the lower plate 16.

In FIG. 8A, the rubbing treatment of the alignment film 26 on the upper plate 18 is shown. The rubbing treatment is carried out over all the surface of the alignment film 26 by the rubbing roller 57 so that the liquid crystal contacting the alignment film 26 can have the pretilt angle α. After this, UV irradiation is carried out as to the domains A, using the mask 60. In this case, the domain B to which UV irradiation does not reach will keep the pretilt angle α, while in the domain A, which the UV radiation reaches has its the pretilt angle changed from α to γ.

Referring now to FIG. 8B, the alignment treatment is effected on the alignment film 22 of the lower plate 16 so that the liquid crystal contacting the alignment film 22 exhibits the pretilt angle β. In this case, the same or different material can be used for the alignment films 26 and 22. It is to be noted, however, that the combination of the alignment material with rubbing treatment determines the difference in the pretilt angle. If the same material is used, the difference of the pretilt angles is made by controlling the number and intensity of the rubbing operations. In either case, it is necessary to satisfy the relationship α>β>γ.

Figure 9:
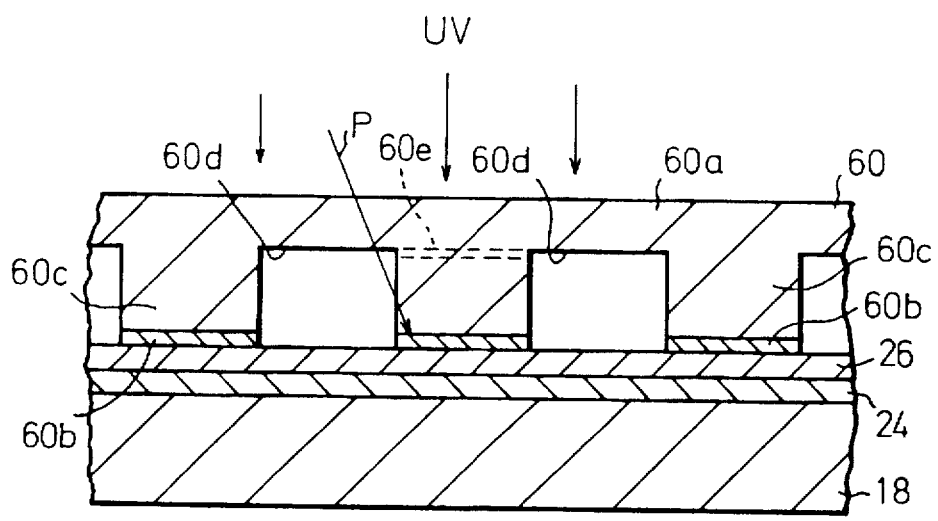
FIG. 9 is a cross-sectional view of a modification of the mask used during UV irradiation.

FIG. 9 relates to an improvement of the mask 60 used to change the pretilt angle by the irradiation of ultraviolet light. The mask 60 comprises a plate 60a made of quartz or synthetic quartz which is transparent to UV light, and a layer of UV blocking material 60b made of chromium which blocks UV light and attached to the plate 60a. In this embodiment, the plate 60a is provided with protrusions 60c to which the layer of UV blocking material is attached. Accordingly, the surface of the layer of UV blocking material 60b protrudes from the surface 60d of the plate 60a.

With this construction, the UV irradiation is performed by bringing the layer of UV blocking material 60b into a position closer to the alignment film 26 of the upper plate 18 or contacting the alignment film 26. In this case, when the UV light arrives obliquely at the mask 60, as shown by the arrow P, this structure can prevent the UV light from reaching the domains under the layer of UV blocking material 60b. If the layer of UV blocking material 60b is located at the position shown by the line 60e, the UV light shown by the arrow P will reach a domain where the UV light is to be blocked, bypassing UV blocking material 60e. It has been proved that this is not desirable.

Figure 10:
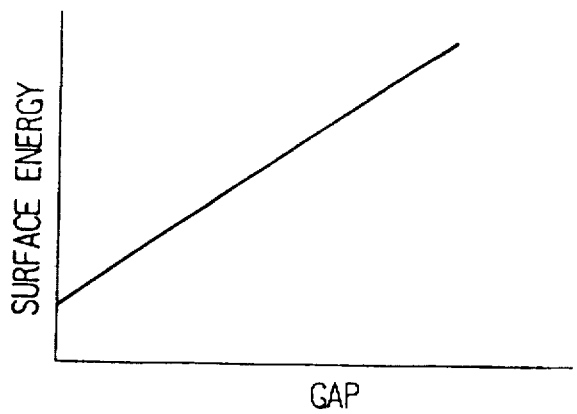
FIG. 10 illustrates the action of the mask of FIG. 9.

In case that the plate 60a is formed flat and the layer of UV blocking material 60b is attached to the flat surface, it is desirable to bring the entire plate 60a closer to the alignment film 26 in order to prevent the oblique UV light from passing under the layer of UV blocking material, but if so arranged, there is an inconvenience in that the surface portions 60d opening between the portions of the layer of UV blocking material 60b of the plate 60a, are brought into positions too close to the alignment film 26. When the gap between the surface portions 60d of openings of the mask 60 and the alignment film 26 of the upper plate 18 is small, the amount of ozone generated in the gap decreases with the result that the effect of reforming the surface of the alignment film 26, by the UV irradiation, decreases. That is, FIG. 10 shows the relationship of the gap between the surface portions 60d of the opening of the mask 60 and the alignment film 26 of the upper plate 18 versus the surface energy (which affects the pretilt angle) of the alignment film 26. The smaller the gap is, the less the surface energy of the alignment film 26 is. It is, therefore, desirable to bring the layer UV blocking material 60b closer to the alignment film 26 but also to make a proper gap between the opening surface portions 60d of the alignment film 26 of the upper film 18.

Figure 11:
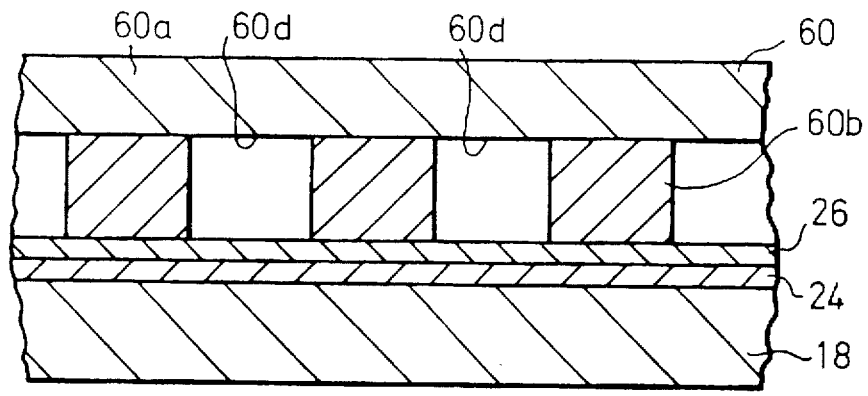
FIG. 11 is a cross-sectional view of a modification of the mask of FIG. 9.

FIG. 11 shows another example of the mask 60 in which the layer of UV blocking material 60b, attached to the UV transparent plate 60a, is formed as a relatively thick structure and the same action as that of FIG. 9 is performed. In this case, it is desirable that the layer of UV blocking material 60b comprises a UV blocking resin.

Figure 12:
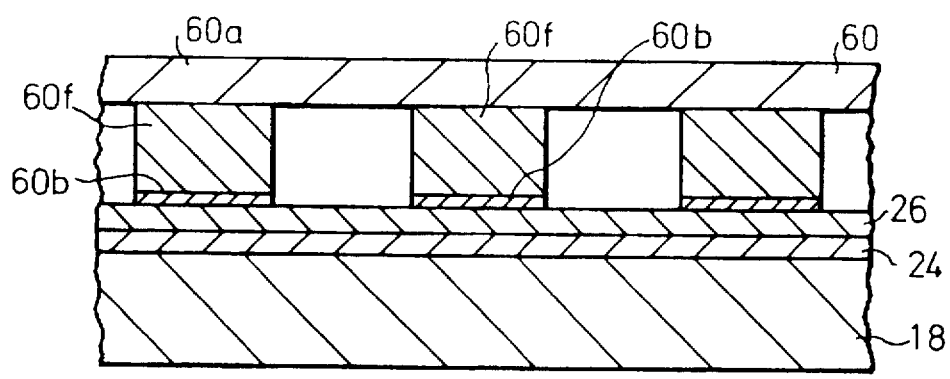
FIG. 12 is a cross-sectional view of another modification of the mask of FIG. 9.

FIG. 12 shows another example of the mask 60 in which spacer 60f is inserted between the UV transparent plate 60a and the layer of UV blocking material 60b and thus the same action as that of FIG. 9 is effected. In this case, it is advisable that the layer of UV blocking material 60b is made from chromium, but the spacer 60f may be made from an appropriate resin.

FIGS. 13A to 13D are views illustrating a third embodiment of the treatment which changes the pretilt angles α and γ of the liquid crystal at the alignment film 26 on the upper plate 18. In this embodiment, the distribution of chemical components of the alignment film 26, which mainly control the pretilt angle of the liquid crystal in the surface region thereof at the domains A and B, is selectively changed.

The treatment comprises the steps of: applying the alignment film 26 to the surface of the upper plate 18 (FIG. 13A), curing the alignment film 26 on the upper plate 18 (FIG. 13B), forming a resist mask 54 on the alignment film 26 and slightly etching the surface portion of the alignment film 26 of the domains A (FIG. 13C), and rubbing the alignment film 26 with the rubbing roller 57 (FIG. 13D), as described with reference to FIG. 23.

Figure 13A:
FIGS. 13A to 13D are views illustrating the steps of changing the pretilt of the liquid crystal display device according to the third embodiment of the present invention.
Figure 13B:
Figure 13C:
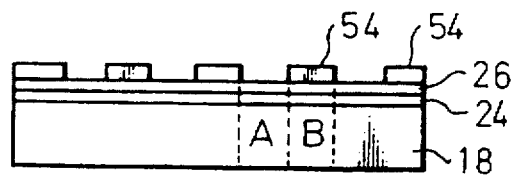
Figure 13D:
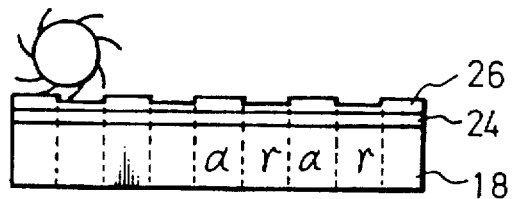
Figure 14:
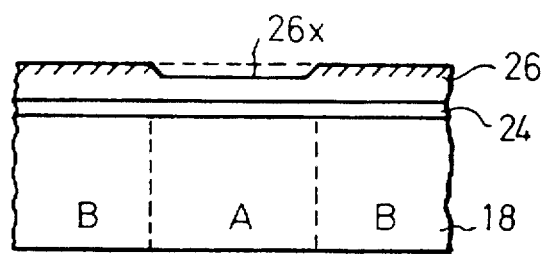
FIG. 14 is an enlarged view of the plate of FIG. 13.

FIG. 14 is a partially enlarged view of the alignment film 26 on which etching was effected as, in the step in FIG. 13C. The alignment film 26 is made of polyimide which is generally a soluble polyimide as described above. The alignment film is formed by dissolving polyimide components in a solvent. The polyimide components include mainly two kinds of chemical components; one kind includes a diamine component, for example, and mainly controls the pretilt angle; and the other kind does not affect the pretilt angles greatly. The former usually shows hydrophobicity and tends to concentrate on the surface of the alignment films 26 in a low humid atmosphere, such as in air and nitrogen. In the curing process of the alignment film 26, if the precuring temperature is kept lower, the chemical components mainly controlling the pretilt angle concentrate generally at a portion near the surface of the alignment film 26.

In FIG. 14, the chemical components mainly controlling the pretilt angle high are distributed near the surface of the alignment film 26, as shown by hatching. By selectively changing the shape of the surface portion of the alignment film 26 where chemical components mainly controlling the pretilt angle concentrate, it is possible to obtain two portions, one including a large amount of chemical component which controls the pretilt angle and the other, not containing a large amount of the chemical components, thereby changing the pretilt angle of the liquid crystal. In this embodiment, etching is employed as a means to change the surface shape of the alignment film 26. It is observed in FIG. 14 that the surface portion 26x, which corresponds to the domain A of the alignment film 26, is removed by etching slightly as in the step in FIG. 13C. In the adjacent minute domain B, a large amount of chemical components which control the pretilt angle remains. Furthermore, in order to reduce the damage of the alignment film 26 by the developing solution for the resist in etching, it is advisable to carry out the postcure of the alignment film 26 at a considerably higher temperature (for example, at 300° C., or 250° C.–300° C. in the case of JALS-214 from Japan Synthetic Rubber K.K.). When polyamic acid type polyimide is used (for example, CRD-4022 distributed by Sumitomo Bakelite K.K. in Japan), it is possible to postcure the alignment film under the temperature of 200° C.

Figure 15:
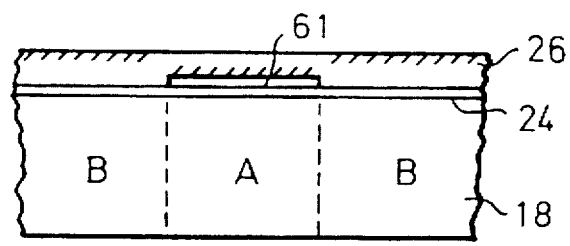
FIG. 15 is a view illustrating a modification to the plate of FIG. 14.

Referring to FIG. 15, as a means to selectively change the distribution of the chemical components mainly controlling the pretilt angle at the surface of the domains A and B, there is further provided a treatment for selectively changing the hydrophobicity of the alignment film 26 between the upper plate 18 and the alignment film 26. That is, there is provided an amorphous silicon layer 61 under the alignment film 26 and on a region corresponding to the minute domain A. The amorphous silicon with no surface oxidizing film presents the hydrophobicity. Therefore, in the alignment film 26 contacting the amorphous silicon layer 61 located under the domain A, the chemical components mainly controlling the pretilt angle gather near the amorphous silicon film 61 and, as a whole, the amount of the chemical components mainly controlling the pretilt angle high is reduced at the surface of the alignment film 26. In FIG. 15, hatching also shows the portions where the chemical components mainly controlling the pretilt angle high concentrate. It is observed that the chemical components mainly controlling the pretilt angle are included in a large amount at the surface of the domain B.

Figure 16:
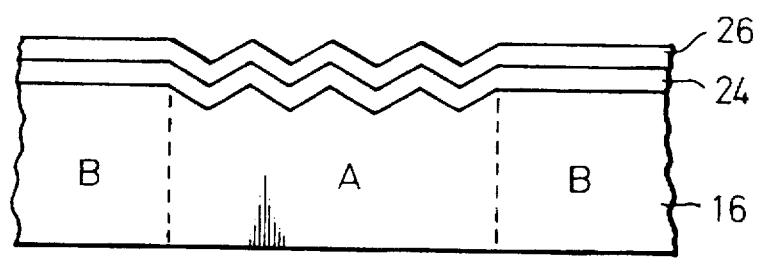
FIG. 16 is a view of an example illustrating the step of changing the pretilt of the liquid crystal display device according to the fourth embodiment of the present invention.

FIG. 16 shows a fourth embodiment of the treatment in which an unevenness is formed on the surface of the domain A to change the pretilt angles α and γ of the liquid crystal of the alignment film 26 on the upper plate 18, as a means for selectively changing the surface shape of the minute domains A and B. The unevenness of the surface of the domain A increases the surface energy of the alignment film 26 and, as described with reference to FIG. 6, the pretilt angle is reduced. FIG. 16 shows an example in which the unevenness formed on the surface of the upper plate 18 causes the unevenness of the alignment film 26. Frosted glass of N0400, 600, 800, and 1000 (sandblast treatment is given) or flat glass was used for the plate with the uneven surface. The alignment film 26 is formed thereon, and the rubbing treatment is then effected thereon. After this, the pretilt angles are measured. The result is shown below (the bigger the sample number is, the finer the mesh is):

| flat | 400 | 600 | 800 | 1000 |
|------|-----|-----|-----|------|
| 6    | 1   | 1   | 1.5 | 1.5  |

Figure 17:
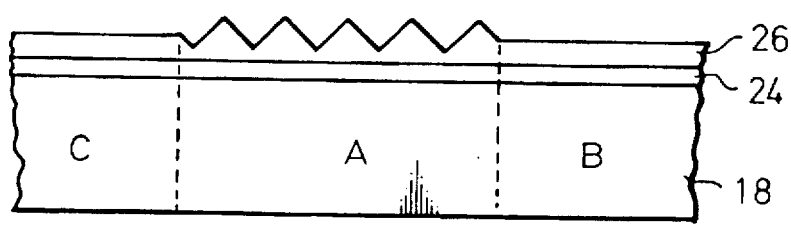
FIG. 17 is a view illustrating a modification to FIG. 16.

FIG. 17 is a modification of the embodiment of FIG. 16, in which the unevenness is directly formed on the alignment film 26. An unevenness, at the surface of the alignment film 26, can be precluded by a treatment known in the semiconductor manufacturing process such as RIE-O (reactive ion etching-oxygen), RIE-Ar (reactive ion etching-Argon), CDE (chemical dry etching), and OA (ozone ashing). The experiment is carried out by forming the alignment film on the glass plate and by effecting the above treatments. After the rubbing treatment, the pretilt angles are measured and the result is as follows:

| NO TREATMENT | RIE-O | RIE-Ar | CDE | OA |
|--------------|-------|--------|-----|-----|
| 6            | 1     | 1      | 1.5 | 0.5 |

In the above treatments, a positive-type resist (available in the market) is used as a mask and the treatment is conducted in a low temperature (for example, at a temperature less than 120° C.) so that the resist can be easily removed afterwards. It is considered that these dry treatments give not only the effect of the unevenness in the surface of the alignment film but also the similar effect to that when the above described UV irradiation is applied.

FIGS. 25A to 25D are views showing a fifth embodiment of the treatment which is intended to change the pretilt angles α and γ of the liquid crystal of the alignment film 26 of the upper plate 18. In this embodiment, there is provided the step of selectively attaching a layer of material which increases or decreases the pretilt angle, to the surface of the minute domains A and B. The embodiment comprises the step of selectively attaching a layer of material which has a property to cause the liquid crystal to align perpendicularly to the plate surface, at one of the minute domains A and B.

The treatment comprises the steps of: applying the alignment film 26 to the surface of the upper plate 18 (FIG. 25A), curing the alignment film 26 on the upper plate 18 (FIG. 25B), inserting the upper plate 18 into a chamber 63 and introducing nitrogen gas containing 1000 ppm of siloxane gas into the chamber 63 to attach the siloxane to the alignment film 26 (FIG. 25C), and rubbing the alignment film 26 by the rubbing roller 57 (FIG. 25C), as described with reference to FIG. 26.

Figure 25A:
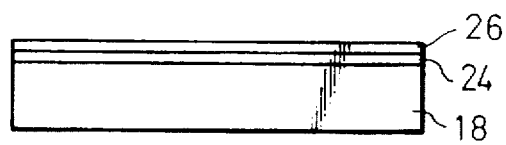
FIGS. 25A to 25D are views illustrating the steps of changing pretilt of the liquid crystal display device according to the fifth embodiment of the present invention.
Figure 25B:
Figure 25C:
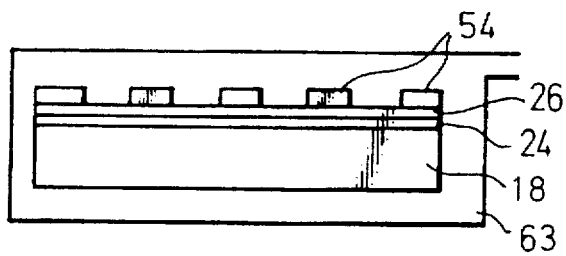
Figure 25D:
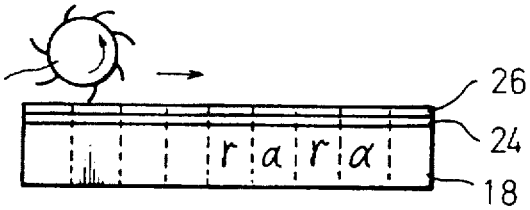

Before the step of FIG. 25C, a resist mask 54 is formed on the alignment film 26, to block the portions corresponding to the domains A of the alignment film 26 and to expose the portions corresponding to the domains B. Accordingly, in the step of FIG. 25C, siloxane deposits on the portion corresponding to the domains B of the alignment film 26. The siloxane is known as a material which can cause the liquid crystal to align perpendicularly to the plate surface and, therefore, the pretilt angle of the liquid crystal in the minute domain B is in the range of 5 to 10 degrees which is larger than that of the domain A where no siloxane deposits. In this case, an alignment material is used, causing the pretilt angle of 1 to 2 degrees after the normal rubbing treatment. The pretilt angle of the minute domain A is thus 1 to 2 degrees. When the alignment film 26 is treated for 10 minutes in nitrogen gas containing 1,000 ppm of siloxane, the pretilt angle of the domain B becomes 6 to 7 degrees after it is rubbed. It is possible to dip the alignment film 26 in siloxane solution in place of treating it in siloxane gas.

FIGS. 26A to 26D show a sixth embodiment of the treatment which changes the pretilt angles α and γ of the liquid crystal of the alignment film 26 of the upper plate 18. The embodiment comprises the steps of selectively heating the domains A and B.

Figure 26A:
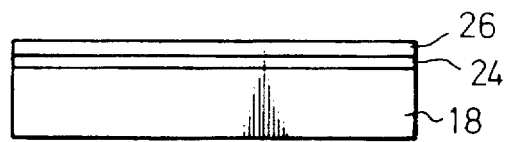
FIGS. 26A to 26D are views illustrating the steps of changing pretilt of the liquid crystal display device according to the sixth embodiment of the present invention.
Figure 26B:
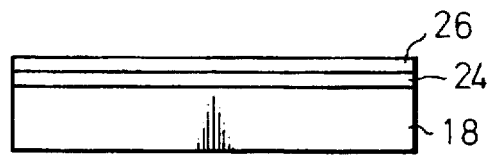
Figure 26C:

This treatment comprises steps of: applying the alignment film 26 to the surface of the upper plate 18 (FIG. 26A), curing the alignment film 26 on the upper plate 18 (FIG. 26B), rubbing the alignment film 26 by the rubbing roller 57 (FIG. 26C), as described with reference to FIG. 23, and selectively heating the alignment film 26 through the mask 65 by a heat source, such as an infrared heater, for example, to 200° C. (FIG. 26C). If the pretilt angle of the liquid crystal contacting the alignment film 26 becomes α when rubbed, heating of the minute domain A by the infrared heater after rubbing changes the effect of the rubbing on the alignment film 26 slightly so as to reduce the pretilt angle from α to γ.

Figure 26D:
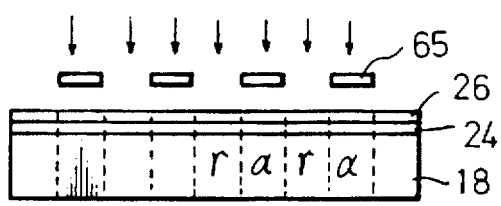
Figure 27:
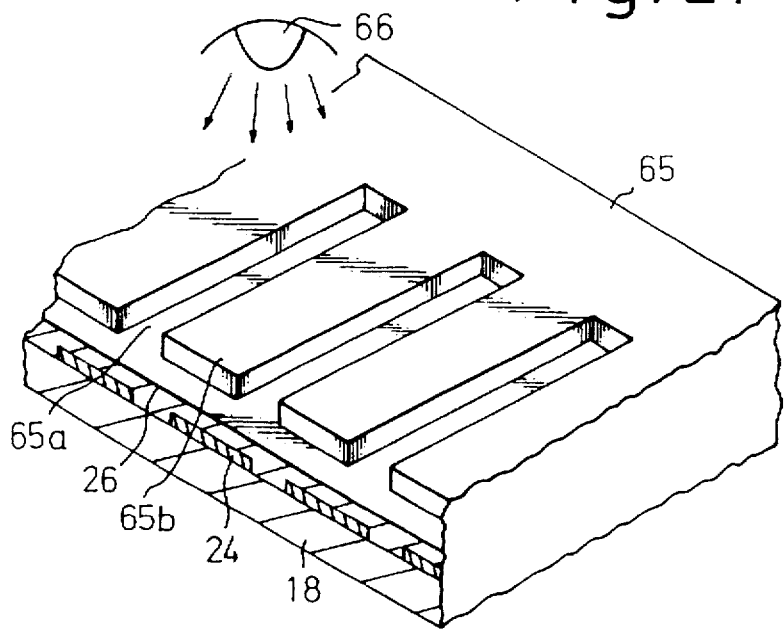
FIG. 27 is a view illustrating an example of a heating means of FIG. 26.

FIG. 27 shows that the heating means of FIG. 26D comprises an infrared heater 66. In this case, the mask 65 is shaped in a comb-like form, including portions 65a allowing the heat to pass through (and portions blocking portions 65b), having a pitch substantially corresponding to one half of the element pitch.

Figure 28:
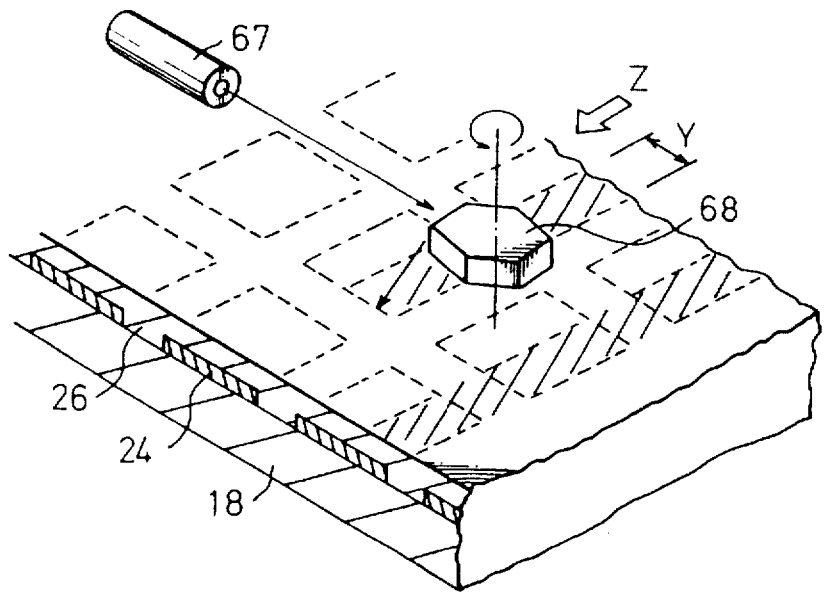
FIG. 28 is a view illustrating another example of the heating means of FIG. 26.

FIG. 28 shows that the heating means of FIG. 26 comprises a laser source 67. Further, there is provided a scanning means for selectively scanning the laser beam irradiated from the laser source 67. The scanning means comprises a polygon mirror 68 which is rotatable about its axis and scans the laser beam in the direction of the width (Y) of the domain A to be heated. The laser source 67 and the polygon mirror 68 are movably arranged in the longitudinal direction (Z) of the domain A. This means that they can heat the domain A in an elongated strip-like area.

Figure 29A:
FIGS. 29A to 29D are views illustrating the steps of changing pretilt of the liquid crystal display device according to the seventh embodiment of the present invention.
Figure 29B:
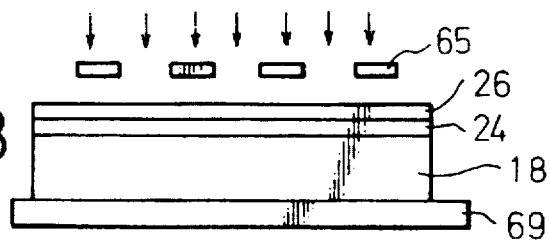
Figure 29C:
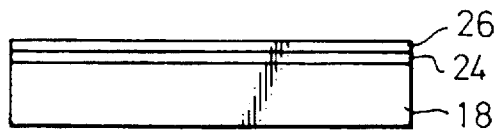
Figure 29D:

FIGS. 29A to 29D are views illustrating a seventh embodiment of the treatment which changes pretilt angles α and γ of the liquid crystal on the alignment film 26 of the upper plate 18. This treatment comprises the steps of applying the alignment film 26 to the upper plate 18 (FIG. 29A) and selectively precuring the domains A and B so as to change the solvent evaporating time (FIG. 29B). In this case, the upper plate 18 is placed on the hot plate 69 and heated from above by the infrared heater. Using the mask 65, the minute domain A is heated while the minute domain B is shielded by the mask 65.

Figure 30:
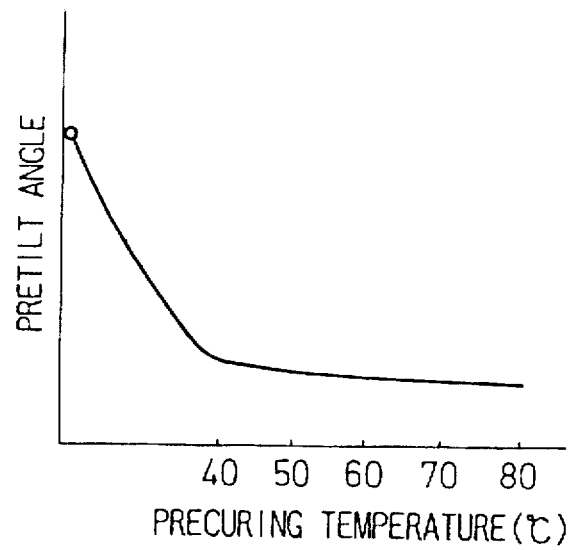
FIG. 30 is illustrates the relationship between the precuring temperature and the pretilt angle.

As shown in FIG. 30, the pretilt angle varies with the precuring treatment and the lower the precuring temperature (the longer the precuring time), the larger the pretilt angle becomes. Accordingly, after the precuring operation, if postcuring and rubbing are carried out as in the steps of FIGS. 29C and 29D, the pretilt angle of the domain B which is precured while being shielded by the mask 65, becomes α and the pretilt angle of the domain A becomes γ.

Figure 31:
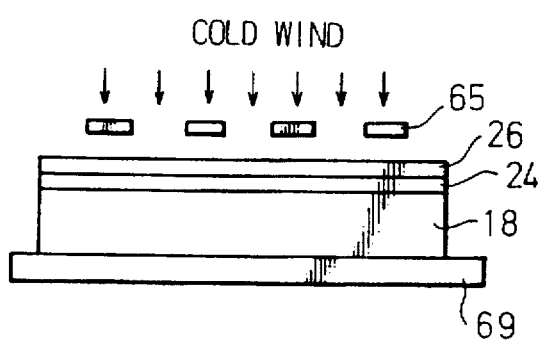
FIG. 31 is a view illustrating a modification to FIG. 29.

FIG. 31 shows a modification of FIG. 29. The alignment film 26 of the upper plate 18 is selectively cooled in this modification, instead of selectively heating the alignment film 26 in the step of FIG. 29B. However, as the upper plate 18 is still on the hot plate 69 in the same manner as FIG. 29, the alignment film 26 is heated as a whole, and the cooling air is intended to selectively adjust the precure temperature.

As described above, according to the present invention, the alignment film on at least one of the plates is formed in a single layer structure and the pretilt angles of the liquid crystal contacting the single alignment film are different from each other in the first and second minute domains. With this construction, it is possible to obtain a liquid crystal display device which is simple in construction, produces a stable image, and has excellent viewing angle and contrast characteristics.

Figure 33:
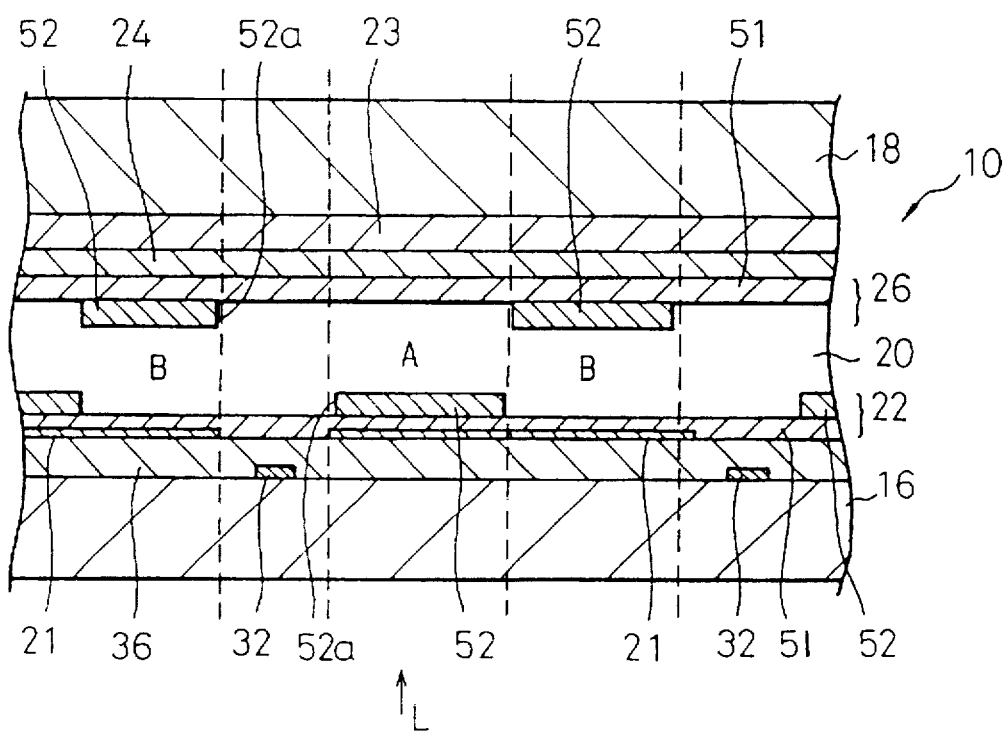
FIG. 33 is a cross-sectional view of the liquid crystal display device according to a further embodiment of the present invention, including the two layered alignment film and the improved disposition between the upper alignment layer and the gate bus lines.
Figure 34:
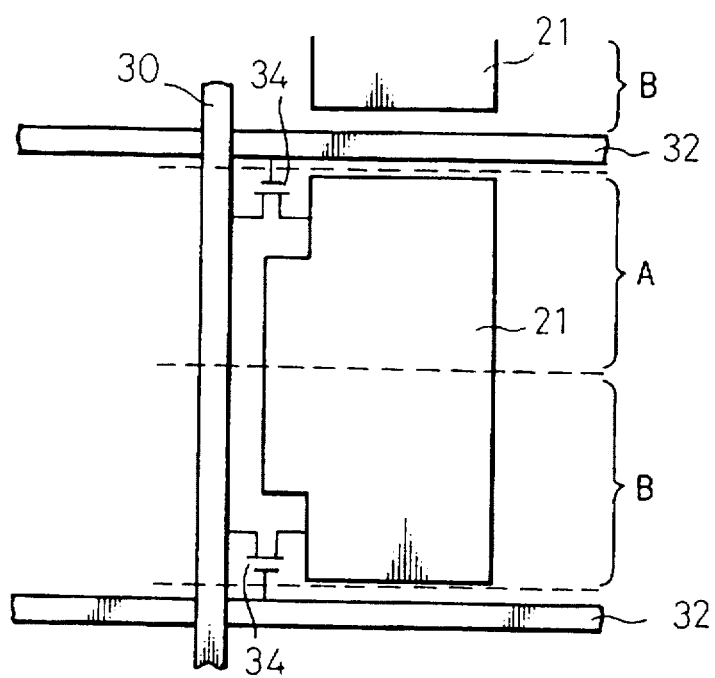
FIG. 34 is a partial enlarged plan view of the element electrode of FIG. 33.

FIG. 33 shows a further embodiment including a two layered alignment film and an improved disposition of the upper alignment layer and the gate bus lines. FIG. 34 is a partial enlarged plan view of the element electrodes of FIG. 33.

In FIG. 33, the liquid crystal panel 10 comprises a pair of transparent glass plates 16 and 18 and a liquid crystal 20 inserted between the glass plates 16 and 18. Polarizers (not shown) are arranged on either side of the liquid crystal panel 10. The lower plate 16 has on its inner surface, a layer of electrodes 21 and an alignment film 22. The upper plate 18 has, on its inner surface, a layer of electrodes 24 and an alignment film 26. In this case, the layer of electrodes 21 on the lower plate 16 comprises a plurality of pixel electrodes, and the layer of electrodes 24 of the upper plate 18 comprises a common electrode. A layer of color filter 23 is provided on the inner surface of the upper plate 18.

As shown in FIG. 34, the pixel electrodes 21 (only one is shown in FIG. 34, and also see FIG. 2) are connected to the active matrix circuit comprising thin film transistors (TFTs) 34, data bus lines 30 and gate bus lines 32 extending in a matrix. Two transistors 34 are arranged for one element electrode 21.

Figure 35:
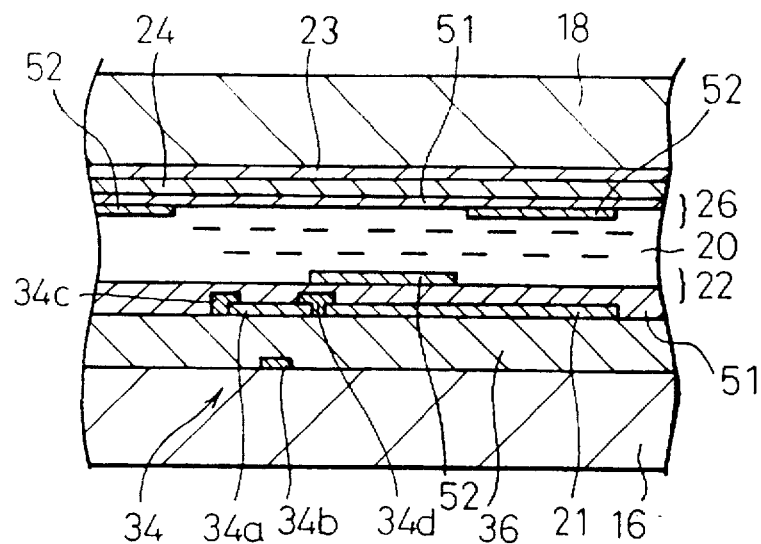
FIG. 35 is a cross-sectional view of the liquid crystal display device similar to FIG. 33 but showing a portion of the thin-film transistor.

As shown in FIG. 35, the transistor 34 comprises a semiconductor layer 34a, a gate electrode 34b, a drain electrode 34c, and a source electrode 34d. The source electrode 34d is connected to the element electrode 21, the drain electrode 34c is connected to the data bus line 30, and the gate electrode 34b is connected to the gate bus line 32. A gate insulating layer 36 is provided between the gate electrode 34b and the semiconductor layer 34a. The gate bus lines 32 and the gate insulating layer 36 are also shown in FIG. 33.

As shown in FIG. 33, each of the alignment films 22 and 26 of the lower and upper plates 16 and 18 comprises a first, lower alignment layer 51 laminated onto the associated plate and a second, upper alignment layer 52 laminated on the first, lower alignment layer 51. The lower alignment layer 51 is applied to the lower plate 16 by spin coating, and the upper alignment layer 52 is also applied to the lower alignment layer 51 by spin coating, but the upper alignment layer 52 is subsequently patterned to have minute portions and openings therebetween generally in correspondence with the minute domains A and B, as described above.

As shown in FIGS. 33 and 34, the element domains A and B are divided at the center of each element electrode 21 and the two domains A and B positioned on one element electrode 21 are continuous. However, there is a gap between two domains A and B which coincides with the gate bus line 32. That is, the portions of the upper alignment layers 52 have ends 52a at positions near the gate bus lines 32 and in a non-overlapping relationship with the gate bus lines 32, respectively. In other words, one end 52a of the portion of the upper alignment layer 52 of the lower plate 16 is spaced, as viewed from above, from one end 52a of the minute portion of the upper alignment layer 52 of the upper plate 18 by a gap, said gap being greater than a width of the gate bus line 32 and the gate bus line 32 being arranged within said gap.

Also, the portions of the upper alignment layers 52 of the lower and upper plates 16 and 18 are staggered so that the minute portions of the upper alignment layer 52 of the lower plate 16 substantially face the lower alignment layer 51 of the upper plate and the portions of the upper alignment layer 52 of the upper plate 18 substantially face the lower alignment layer 51 of the lower plate 16.

The materials used for the lower and upper layers 51 and 52 are different, so that when the rubbing is effected in an identical manner both for the lower and upper layers 51 and 52, the pretilt angle of the liquid crystal contacting the upper alignment layer 52 becomes α, and the pretilt angle of the liquid crystal contacting the lower alignment layer 51 via the openings of the upper alignment 52 layer becomes γ. The pretilt angles satisfy the relationship α>γ. For example, the material for the lower alignment layer 51 comprises an inorganic material such as $SiO_2$ or $TiO_2$, and the material for the upper alignment layer 52 comprises an organic material such as polyimide. It is also possible use different polyimides for the lower and upper layers 51 and 52.

Figure 36:
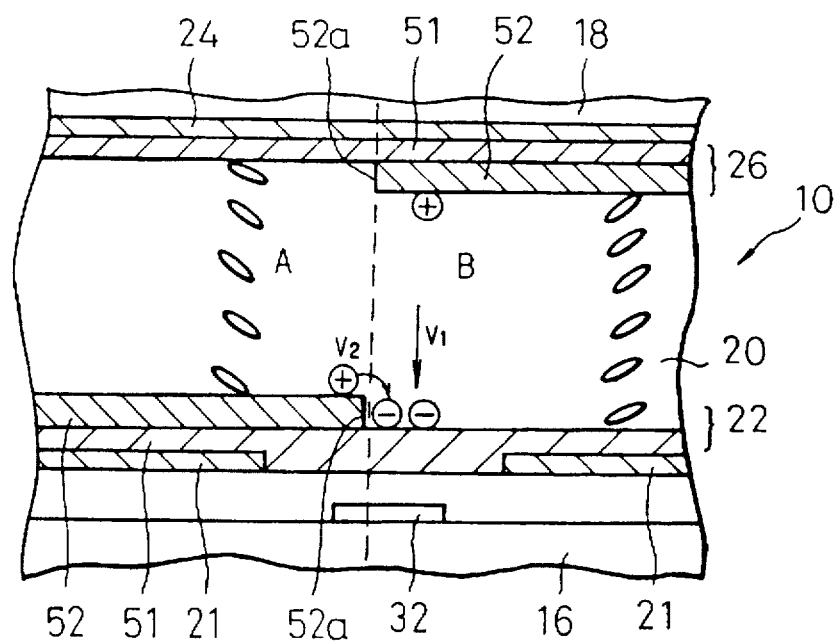
FIG. 36 is a cross-sectional view of the liquid crystal display device illustrating a problem existing therein.

The alignment films 22 and 26 are subjected to the rubbing treatment of FIG. 22, and it will be apparent that the element division can be attained. This arrangement aims to solve the problem existing in the liquid crystal display apparatus of FIG. 36. In FIG. 36, each of the alignment films 22 and 26 of the lower and upper plates 16 and 18 comprises a lower alignment layer 51 and an upper alignment layer 52. The domains A and B are divided at the center of each pixel electrode 21 and at a line coinciding with the gate bus line 32. That is, one end 52a of the minute portion of the upper alignment layer 52 of the lower plate 16 and one end 52a of the portion of the upper alignment layer 52 of the upper plate 18 are at a position in an overlapping relationship with the gate bus line 32. Therefore, the liquid crystal is subjected to an electrolysis which generates ions, resulting in that the liquid crystal is deteriorated and the quality of the liquid crystal display device decreases.

Figure 37:
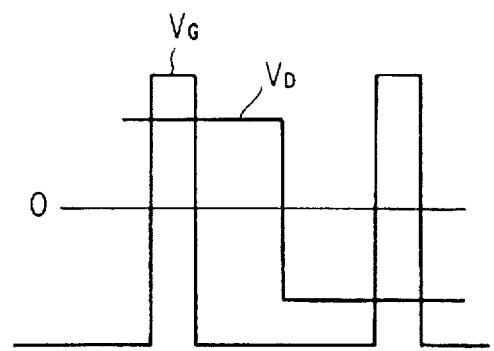
FIG. 37 is a block diagram illustrating the voltage driving the liquid crystal.

One of the reasons why the liquid crystal is subjected to an electrolysis is that the liquid crystal is sandwiched between the lower and upper alignment layers 51 and 52, of different materials. This is similar to the case where an electrolysis occurs when two different electrodes are inserted in a solution. Another reason is that the liquid crystal is driven by a direct current. As shown in FIG. 37, to drive the liquid crystal, voltage $V_G$ is applied to the gate bus lines 32, and voltage $V_D$ is applied to the data bus lines 30. The common electrode 24 is grounded. Voltage $V_G$ applied to the gate bus lines 32 have a positive pulse value delivered to a pixel electrode 21, and a constant minus value maintained until the next pulse to be delivered to the pixel electrode 21 after one pulse. A plurality, for example four hundred, gate bus lines 32 is provided, which are scanned one after another. Each gate bus line 32 has a plus value for 1/400th of the scan time, and the constant minus value for 399/400th of the scan time. Therefore, the liquid crystal normally receives a direct voltage between the gate bus lines 32 and the common electrode 24. In FIG. 36, a potential difference $V_1$ occurs between the lower and upper alignment layers 51 and 52 above the gate bus lines 32, and a potential difference $V_2$ occurs between the lower and upper alignment layers 51 and 52 of the lower plate 16. If there is a leak in the gate insulating layer, the direct voltage between the liquid crystal and the alignment film becomes large. When two gate bus lines 32 are arranged in a side by side relationship, the space between these two gate bus lines 32 is at the same potential as the gate bus lines 32.

In FIG. 33, the portions of the upper alignment layer 52 is not located in a non-overlapping relationship with the gate bus lines 32, and thus the liquid crystal is not subjected to an electrolysis, resulting in the liquid crystal becoming less deteriorated.

Figure 38:
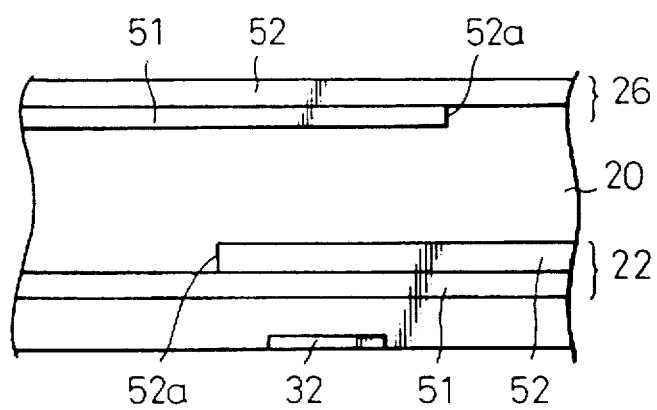
FIG. 38 is a diagrammatic cross-sectional view of the liquid crystal display device according to a further embodiment.

In FIG. 38, both the upper alignment layers 52 on the lower and upper plates 16 and 18 cover the gate bus line 32, and the respective ends 52a of the upper alignment layers 52 of the lower and upper plates 16 and 18 do not overlap with the gate bus line 32. In this case, the same upper alignment layers 52 exist on the lower and upper plates 16 and 18 and electrolysis does not occur between the same upper alignment layers 52 even if the direct voltage is applied therebetween.

Figure 39:
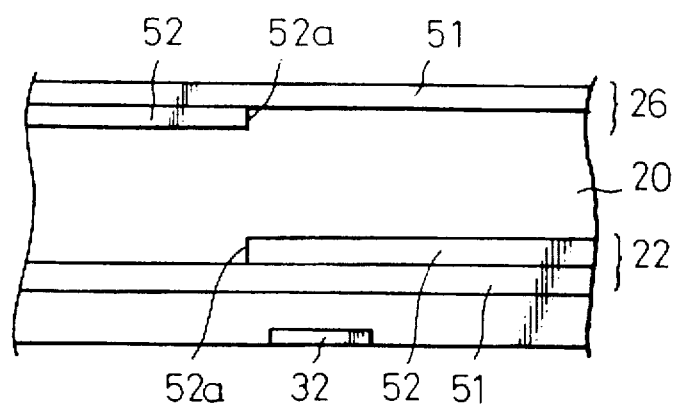
FIG. 39 is a diagrammatic cross-sectional view of the liquid crystal display device according to a still further embodiment.

In FIG. 39, the upper alignment layer 52 of the lower plate 16 covers the gate bus line 32, and the upper alignment layers 52 of the upper plate 18 is formed at a position spaced apart from the gate bus line 32. The respective one ends 52a of the upper alignment layers 52 of the lower and upper plates 16 and 18 do not overlap with the gate bus line 32. In this case, the different upper and lower alignment layers 52 and 51 exist above the gate bus line 32. Therefore, the potential difference $V_1$, as described with reference to FIG. 36, may exist but the potential difference $V_2$, as described with reference to FIG. 36, will not exist. Accordingly, it is possible to reduce the effect of electrolysis derived from the potential difference $V_2$ (FIG. 36).

Figure 40:
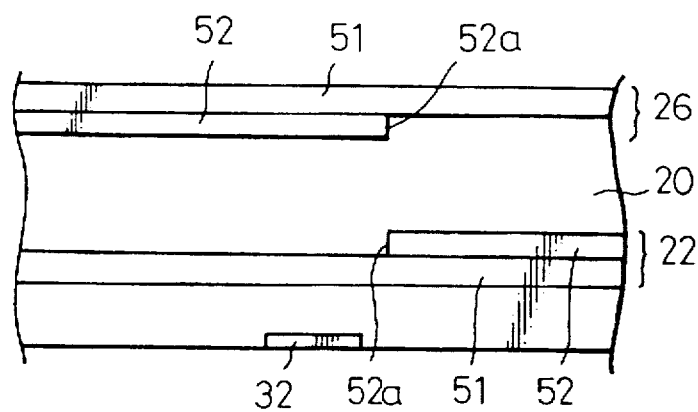
FIG. 40 is a diagrammatic cross-sectional view of the liquid crystal display device according to a still further embodiment.

In FIG. 40, the arrangement is reversed to that of FIG. 39, and it is possible to reduce the effect of electrolysis derived from the potential difference $V_2$.

Figure 41:
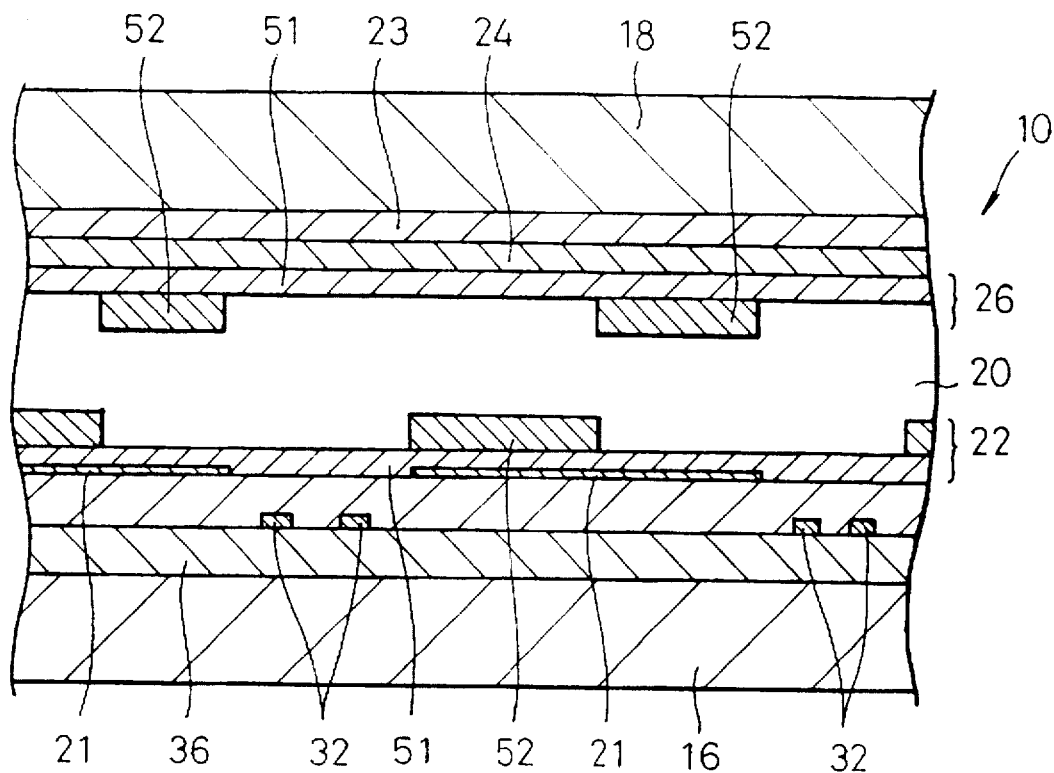
FIG. 41 is a cross-sectional view of the liquid crystal display device according to still further embodiment.

In FIG. 41, two gate bus lines 32 are arranged in a side by side relationship between two adjacent element electrodes 21, and the space between these two gate bus lines 32 is at the same potential as the gate bus lines 32. In this case, it is necessary to consider that the total width of two gate bus lines 32 and the width of that space corresponds to one gate bus line 32 in the previous embodiments.

Figure 42:
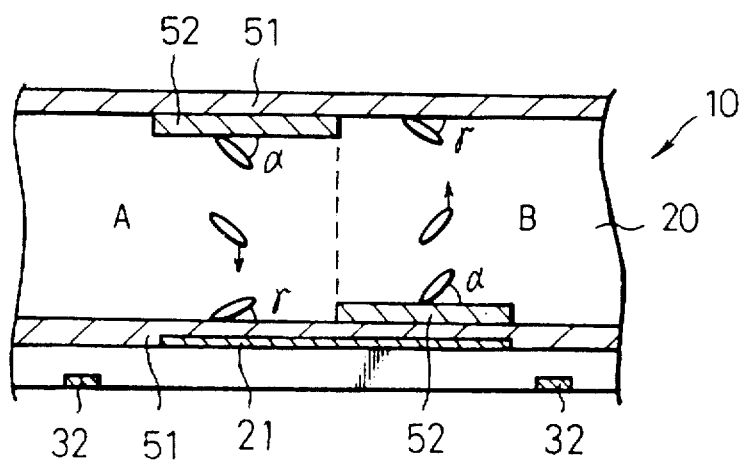
FIG. 42 is a diagrammatic cross-sectional view of the liquid crystal display device according to a still further embodiment.

FIG. 42 shows the embodiment generally similar to that of FIG. 32, except that each of the alignment films 22 and 26 comprises a lower alignment layer 51 and an upper alignment layer 52. It is possible to revise this arrangement so that the upper alignment layers 52 do not overlap with the pixel electrode 32, in a manner described above.

Figure 43:
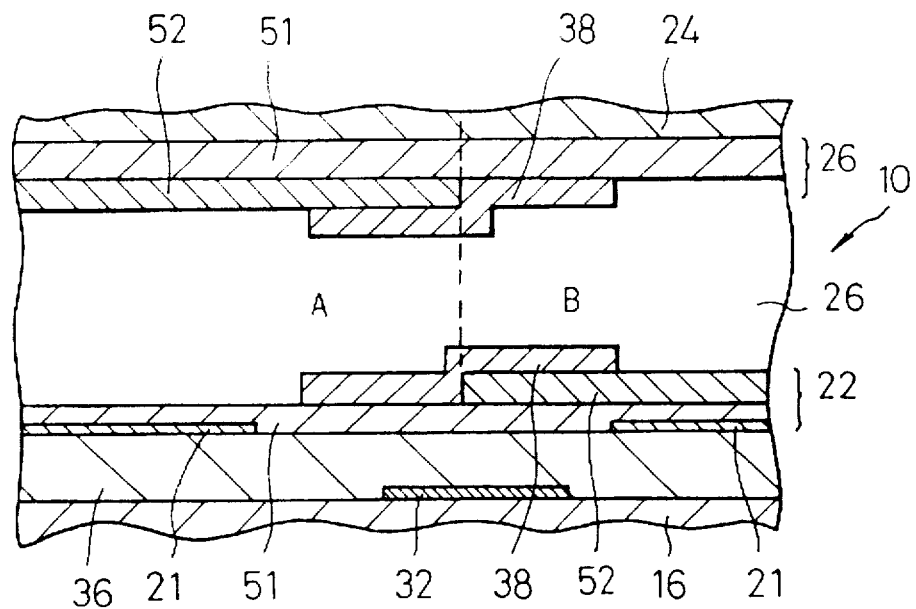
FIG. 43 is a diagrammatic cross-sectional view of the liquid crystal display device according to a still further embodiment.

FIG. 43 shows a still further embodiment, intended to solve the problem of the arrangement of FIG. 36. In FIG. 43, a conductive layer 38 is arranged to cover an end portion of the upper alignment layer 52 and a portion of the lower alignment layer 51. The conductive layer 38 comprises a thin film of aluminum shaped in a predetermined pattern. By this arrangement, there is no potential difference between the end portion of the upper alignment layer 52 and a portion of the lower alignment layer 51 adjacent to this end portion of the upper alignment layer 52, within one of the plates 16 and 18, and it is possible to prevent the liquid crystal from deteriorating. Also, in the region of the gate bus line 32, regarding the opposite plates 16 and 18, the same conductive layers 38 are oppositely arranged, and the liquid crystal does not significantly deteriorate. It is possible to arrange resistant layers instead of the conductive layers 38. In this case, the potential difference is not reduced but the liquid crystal does not significantly deteriorate because the liquid crystal contacts the same resistive layers.

Figure 44:
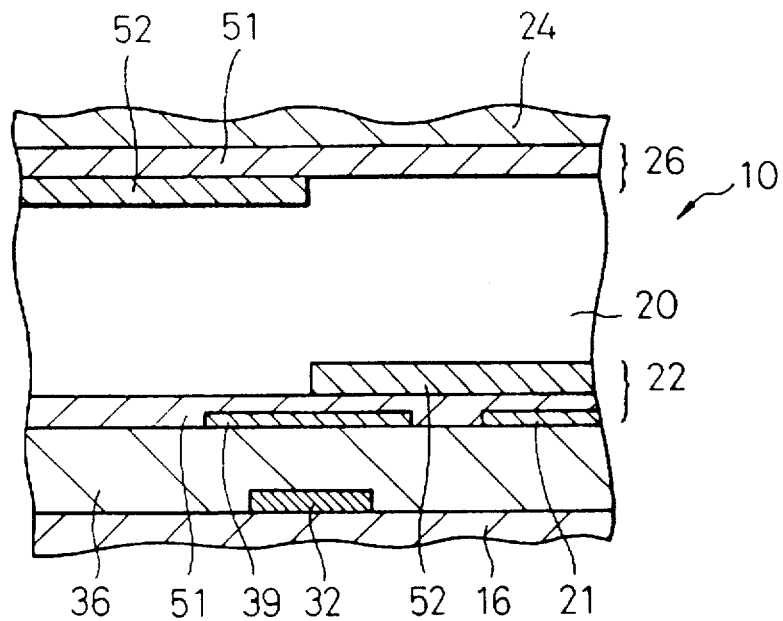
FIG. 44 is a diagrammatic cross-sectional view of the liquid crystal display device according to a still further embodiment.

FIG. 44 shows a still further embodiment. In FIG. 44, a conductive layer 39 is arranged to cover the gate bus line 32 and is connected to the common electrode 24. The conductive layer 39 comprises a thin film of aluminum shaped in a predetermined pattern. By this arrangement, there is no potential difference between the portions where the different alignment materials are oppositely arranged, and it is possible to prevent the liquid crystal from deteriorating.

Figure 45A:
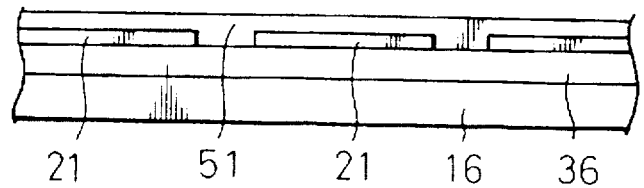
FIGS. 45A to 45D are views illustrating the formation of the upper alignment layer by the printing method.
Figure 45B:
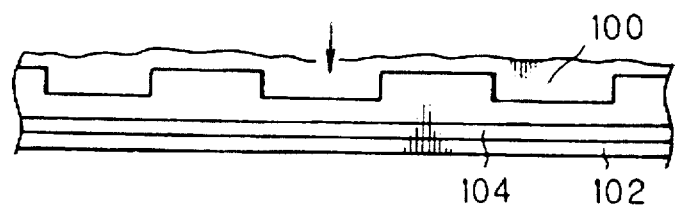
Figure 45C:
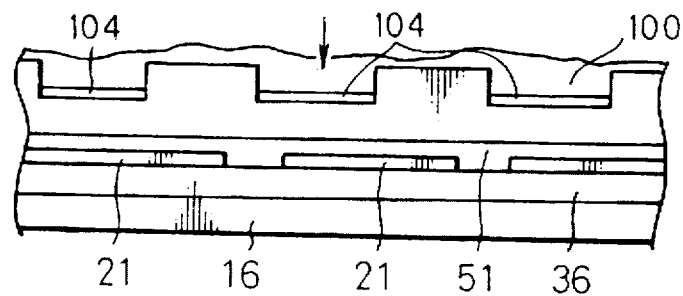
Figure 45D:
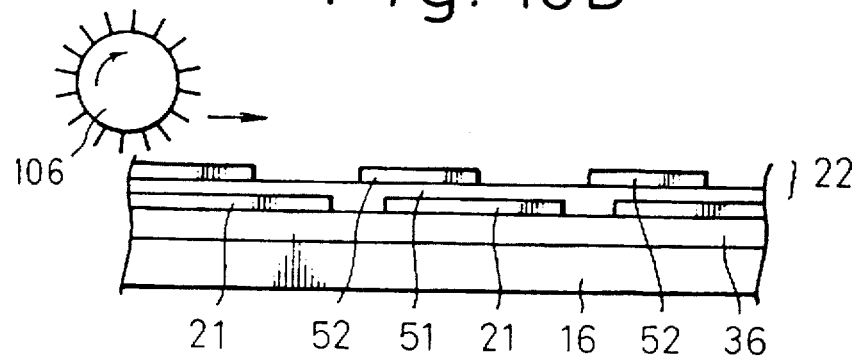

FIGS. 45A to 45D show an example in which the upper alignment layer is formed by a printing method. FIG. 45A shows the step of applying the first, lower alignment layer 51 to the lower plate 16. FIG. 45B shows the step of lowering a printing plate 100 having patterns in correspondence with the domains A and B, to an ink pad 102 containing an ink 104, and FIG. 45C shows the step of pressing the printing plate 100 to the first, lower alignment layer 51 of the lower plate 16 to form the second, upper alignment layer 52. Then the alignment film, comprising the lower and upper alignment layers 51 and 52, is rubbed by the rubbing roller 106, as shown in FIG. 45D. In this case, the gate bus lines 32 (not shown in FIGS. 45A to 45D) can be arranged, relatively to the upper alignment layer 52, in a manner described in the above embodiments. To form the upper alignment layer 52, it is possible to use any desired printing method such as, relief printing, gravure printing, screen printing, or intaglio printing.

Figure 46A:
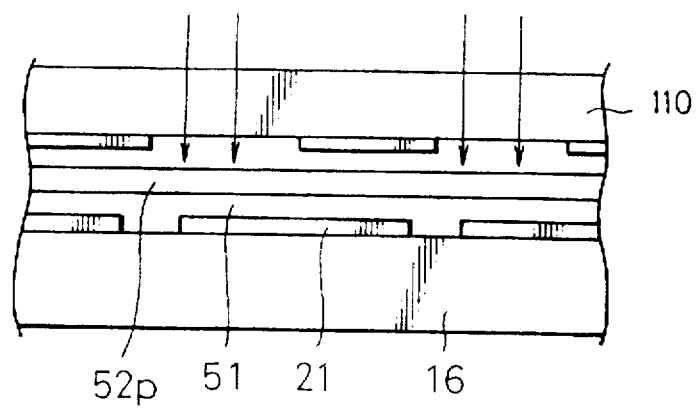
FIGS. 46A and 46B are views illustrating the formation of the upper alignment layer by another method.
Figure 46B:
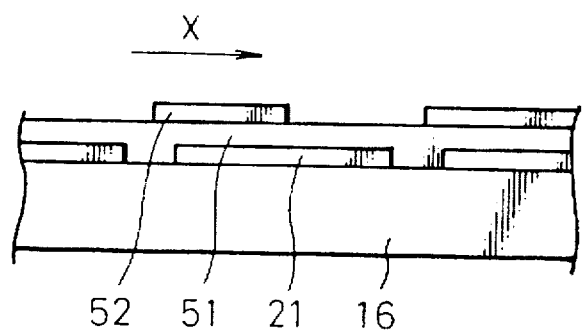

FIGS. 46A and 46B are views illustrating the formation of the upper alignment layer by another method. In this case, the alignment film comprises the lower and upper layers 51 and 52. The upper alignment layer 52 comprises a photosensitive material which is patterned on the lower alignment layer 51 by etching. That is, FIG. 46A shows the step of applying the lower alignment layer 51 and a layer of material 52p, for forming the upper alignment layer 52, to the lower plate 16. FIG. 46A shows the step of patterning the layer of material 52p by exposing the layer of material 52p via a mask 110 having a predetermined pattern. Then the photosensitive portions or non-photosensitive portions of the layer of material 52p are removed by etching, as shown in FIG. 46B. Then the alignment film comprising the lower and upper alignment layers 51 and 52 is rubbed by the rubbing roller, as shown by the arrow X.

Figure 47:
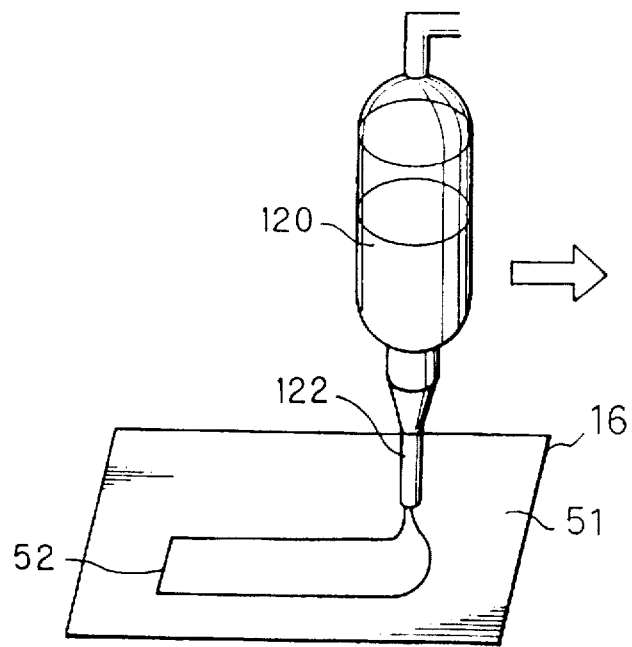
FIG. 47 is a view illustrating the formation of the upper alignment layer by another method.
Figure 48:
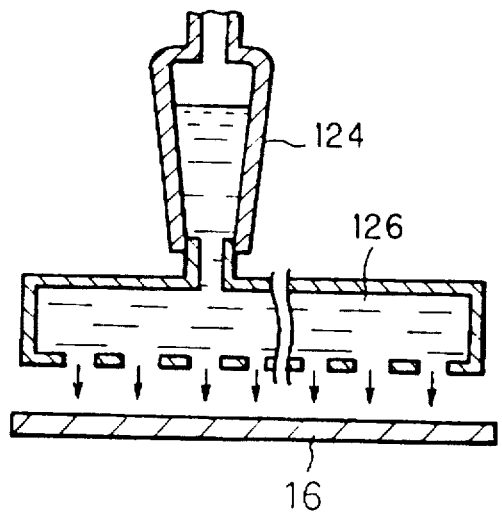
FIG. 48 is a view illustrating the formation of the upper alignment layer by another method.
Figure 49:
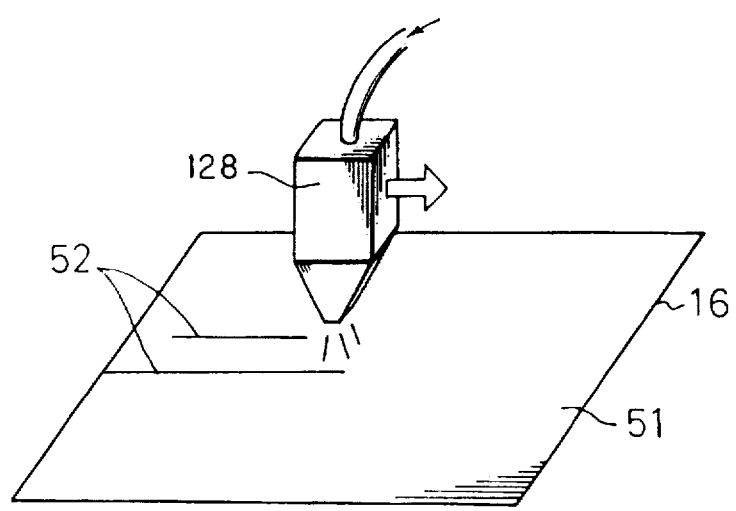
FIG. 49 is a view illustrating the formation of the upper alignment layer by another method.

FIGS. 47 to 49 show further embodiments, for forming the upper alignment layer 52 on the lower alignment layer 51, by extruding methods. In FIG. 47, a dispenser 120 contains a material for the upper alignment layer 52 and has nozzle 122. When pneumatic pressure is delivered to the dispenser 120, the material for the upper alignment layer 52 is extruded in a line pattern and adheres to the lower alignment layer 51 as the upper alignment layer 52. The width of the upper alignment layer 52 is approximately one half of one element, for example, approximately 300 microns.

In FIG. 48, a dispenser 124 contains a material for the upper alignment layer 52 and has plurality of nozzles 126. When a pneumatic pressure is delivered to the dispenser 124, the material for the upper alignment layer 52 is extruded in a pattern of parallel lines and adheres to the lower alignment layer 51 as the upper alignment layer 52.

In FIG. 49, an extruding device 128 which is an application of an ink jet device is shown, to form the upper alignment layer 52 in a line pattern.

We claim:

1. In a method for manufacturing a liquid crystal display device comprising a first plate having a first alignment film thereon formed of a single layer of an alignment material including first and second adjacent minute alignment film domains, a second plate arranged to face the first plate and having a second alignment film thereon, and a liquid crystal material inserted between the first and second alignment films and in contact therewith, said method comprising:

rubbing the first alignment film to align said liquid crystal material at said domains; and selectively applying a surface modifying energy to the first alignment film at said first domain thereof to thereby change a pretilt angle of the liquid crystal material contacting said first alignment film at said first domain to be different than a pretilt angle of the liquid crystal material contacting said first alignment film at said second domain thereof.

2. A method according to claim 1, wherein said step of selectively applying a surface modifying energy comprises irradiating said first alignment film with ultraviolet light at said first domain thereof.

3. A method according to claim 2, wherein said rubbing step precedes the irradiating step.

4. A method according to claim 2, wherein said irradiating step precedes the rubbing step.

5. A method according to claim 2, wherein α and γ define the pretilt angle of the liquid crystal respectively contacting the first and second, adjacent minute domains of the first alignment film, and wherein said method further comprises rubbing the second alignment film so that the liquid crystal contacting the second alignment film has a third pretilt angle β, said angles having a relationship of α>β>γ.

6. A method according to claim 5, wherein before or after the further rubbing step, the second alignment film is irradiated with ultraviolet light.

7. A method according to claim 2, wherein, the irradiating step further comprises employing a mask which allows ultraviolet light to pass therethrough to said first domain and prevents ultraviolet light from reaching said second domain.

8. A method according to claim 7, wherein said mask comprises a third plate made of a material transparent to ultraviolet light and a blocking layer made of a material blocking ultraviolet light arranged on a surface of the third plate in correspondence with the location of the second domain.

9. A method according to claim 8, wherein a surface of the ultraviolet light blocking material layer protrudes from a surface of an opening in the third plate.

10. A method according to claim 8, wherein the ultraviolet blocking material of the blocking layer comprises at least one of chromium and an ultraviolet blocking resin.

11. A method according to claim 2, wherein the irradiating step is caused to take place in an oxygen-containing atmosphere.

12. A method as set forth in claim 1, wherein said step of selectively applying a surface modifying energy comprises heating said first alignment film at said first domain.

13. A method according to claim 12, wherein said heating is performed using one of an infrared heater and a laser.

14. A method according to claim 12, wherein said heating is performed using a mask having a first portion allowing passage of heat therethrough and a second portion blocking passage of heat therethrough.

15. A method according to claim 14, wherein said liquid crystal display device comprises a plurality of individual display elements arranged in accordance with an element pitch and said first portion is approximately of a size of one half of the element pitch.

16. A method according to claim 12, wherein said heating step comprises using a laser source to produce a laser beam and selectively scanning the laser beam from the laser source onto the first alignment film at the first domain.

17. A method for manufacturing a liquid crystal display device comprising a first plate having a first alignment film thereon formed of a single layer of an alignment material including first and second adjacent minute alignment film domains, a second plate arranged to face the first plate and having a second alignment film thereon, and a liquid crystal material inserted between the first and second alignment films and in contact therewith, said method comprising:

rubbing the first alignment film to align said liquid crystal material at said domains; and selectively applying a surface modifying energy to the first alignment film at said first domain thereof to thereby change a pretilt angle of the liquid crystal material contacting said first alignment film at said first domain to be different than a pretilt angle of the liquid crystal material contacting said first alignment film at said second domain thereof, wherein said step of selectively applying a surface modifying energy comprises irradiating said first alignment film with ultraviolet light at said first domain thereof, and wherein the ultraviolet light has a wavelength of less than 300 nm.

18. A method according to claim 17, wherein the first alignment film is irradiated with ultraviolet light having a wavelength of less than 260 nm.

19. A method for manufacturing a liquid crystal display device comprising a first plate having a first alignment film thereon formed of a single layer of an alignment material including first and second adjacent minute alignment film domains, a second plate arranged to face the first plate and having a second alignment film thereon, and a liquid crystal material inserted between the first and second alignment films and in contact therewith, said method comprising:

rubbing the first alignment film to align said liquid crystal material at said domains; and selectively applying a surface modifying energy to the first alignment film at said first domain thereof to thereby change a pretilt angle of the liquid crystal material contacting said first alignment film at said first domain to be different than a pretilt angle of the liquid crystal material contacting said first alignment film at said second domain thereof, wherein said step of selectively applying a surface modifying energy comprises irradiating said first alignment film with ultraviolet light at said first domain thereof, wherein, the irradiating step further comprises employing a mask which allows ultraviolet light to pass therethrough to said first domain and prevents ultraviolet light from reaching said second domain, wherein said mask comprises a third plate made of a material transparent to ultraviolet light and a blocking layer made of a material blocking ultraviolet light arranged on a surface of the third plate in correspondence with the location of the second domain; and wherein the ultraviolet transparent material of the third plate comprises quartz or synthetic quartz.

20. A method for manufacturing a liquid crystal display device comprising a first plate having a first alignment film thereon formed of a single layer of an alignment material including first and second adjacent minute alignment film domains, a second plate arranged to face the first plate and having a second alignment film thereon, and a liquid crystal material inserted between the first and second alignment films and in contact therewith, said method comprising:

rubbing the first alignment film to align said liquid crystal material at said domains; and selectively applying a surface modifying energy to the first alignment film at said first domain thereof to thereby change a pretilt angle of the liquid crystal material contacting said first alignment film at said first domain to be different than a pretilt angle of the liquid crystal material contacting said first alignment film at said second domain thereof, wherein said step of selectively applying a surface modifying energy comprises heating said first alignment film at said first domain, wherein said heating step comprises using a laser source to produce a laser beam and selectively scanning the laser beam from the laser source onto the first alignment film at the first domain, and wherein the first domain has a length and a width, and the laser beam is scanned in the direction of the width of the first domain, said laser source being movable in the longitudinal direction of the first domain.

21. A method for manufacturing a liquid crystal display device comprising a first plate having an alignment film, a second plate arranged to face the first plate and having an alignment film, a liquid crystal inserted between the first and second plates, the alignment film of at least the first plate comprising a single layer of alignment material having a plurality of first and second, adjacent minute domains, the method comprising the steps of:

precuring the single layer of alignment material at the first and second, adjacent minute domains after applying the alignment material to the first plate so that the solvent evaporating time at one of the first and second, adjacent minute domains is different from the solvent evaporating time at the other domain, so that a pretilt angle of the liquid crystal contacting the single layer of alignment material at one of the first and second, adjacent minute domains is differentiated from a pretilt angle of the liquid crystal contacting the single layer of alignment material at the other domain; and rubbing the precured single layer of alignment material at the first and second, adjacent minute domains.

22. A method according to claim 21, wherein said step of selectively precuring comprises using a mask having a portion allowing heat from a heater to pass therethrough to the alignment film on the first plate and another portion blocking the passage of heat from the heater therethrough.

23. A method according to claim 21, wherein said step of precuring comprises the steps of heating the alignment film of the first plate by heat from a heater and simultaneously cooling the alignment film of the first plate in a selected domain of the first and second, adjacent minute domains.

24. A liquid crystal display device comprising:

first and second opposed plates having facing inner surfaces;

a liquid crystal inserted between the first and second plates;

gate bus lines and drain bus lines arranged in a matrix on the first plate;

element electrodes arranged on the first plate and connected to said bus lines;

an alignment film arranged on the first plate; and an alignment film arranged on the second plate, each of the alignment films of the first and second plates comprising a first, lower alignment layer laminated on the associated plate and a second, upper alignment layer laminated on the first, lower alignment layer, the second, upper alignment layer being divided into a plurality of minute portions having respective ends at positions near gate bus lines and in a non-overlapping relationship with the gate bus lines, respectively, to thereby avoid electrolysis and the concomitant deterioration of the liquid crystal, the minute portions of the second, upper alignment layers of the first and second plates being staggered so that minute portions of the second, upper alignment layer of the first plate substantially face the first alignment layer of the second plate and the minute portions of the second, upper alignment layer of the second plate substantially face the first alignment layer of the first plate, whereby an alignment condition of the liquid crystal varies at each minute portion.

25. A liquid crystal display device according to claim 24, wherein one end of the minute portions of the second, upper alignment layer of the first plate are spaced from one end of the minute portions of the second, upper alignment layer of the second plate by a gap, said gap being greater than the width of a gate bus line and the gate bus line being arranged within said gap.

26. A liquid crystal display device according to claim 24, wherein each gate bus line is arranged within a gap formed between minute portions of the second, upper alignment layers of the first and second plates.

27. A liquid crystal display device according to claim 24, wherein each second, upper alignment layer is printed on each first, lower alignment layer.

28. A liquid crystal display device according to claim 24, wherein each second, upper alignment layer comprises a photosensitive material which is patterned by etching and disposed on each first, lower alignment layer.

29. A liquid crystal display device according to claim 24, wherein each second, upper alignment layer is formed by extrusion on each first, lower alignment layer.

30. A liquid crystal display device comprising:

first and second opposed plates having facing inner surfaces;

a liquid crystal inserted between the first and second plates;

gate bus lines and drain bus lines arranged in a matrix on the first plate;

pixel electrodes arranged on the first plate and connected to said bus lines;

an alignment film arranged on the first plate;

an alignment film arranged on the second plate, each of the alignment films of the first and second plates comprising a first, lower alignment layer laminated on the associated plate and a second, upper alignment layer laminated on the first, lower alignment layer, the second, upper alignment layer being divided into a plurality of minute portions having ends at positions near the gate bus lines; and a conductive or an insulating layer arranged on each of the first and second plates only in an overlapping relationship relative to said gate bus lines to thereby avoid electrolysis and the concomitant deterioration of the liquid crystal, the minute portions of the second, upper alignment layers, respectively of the first and second plates, being staggered so that the minute portions of the second, upper alignment layer of the first plate substantially face the first alignment layer of the second plate and the minute portions of the second, upper alignment layer of the second plate substantially face the first alignment layer of the first plate, whereby an alignment condition of the liquid crystal varies at each minute domain.

31. A liquid crystal display device according to claim 30, wherein each second, upper alignment layer is printed on each first, lower alignment layer.

32. A liquid crystal display device comprising:

a first plate having an alignment film thereon;

a second plate opposed to the first plate and having an alignment film thereon; and a liquid crystal inserted between the first and second alignment films and in contact therewith, each of the alignment films comprising a single layer of alignment material including first and second adjacent minute domains, each single layer of alignment material being characterized by having been continuously rubbed in one direction across said first and second minute alignment film domains thereof, said single layers of alignment material being further characterized by having had a surface modifying energy applied thereto at a surface of the first domain so that the pretilt angle of the liquid crystal contacting the alignment layer at the first minute domain thereof is changed to be different than the pretilt angle of the liquid crystal contacting the alignment layer at the second domain thereof, and so that said pretilt angles are opposed to each other.

33. A method for manufacturing a liquid crystal display device comprising a first plate having a first alignment film thereon formed of a single layer of an alignment material including first and second adjacent minute alignment film domains, a second plate arranged to face the first plate and having a second alignment film thereon, and a liquid crystal material inserted between the first and second alignment films and in contact therewith, said method comprising:

rubbing the first alignment film to align said liquid crystal material at said domains; and selectively applying a surface modifying energy to the first alignment film at said first domain thereof to thereby change a pretilt angle of the liquid crystal material contacting said first alignment film at said first domain to be different than a pretilt angle of the liquid crystal material contacting said first alignment film at said second domain thereof, wherein said step of selectively applying a surface modifying energy comprises irradiating said first alignment film with ultraviolet light at said first domain thereof, wherein $\alpha$ and $\gamma$ define the pretilt angle of the liquid crystal material respectively contacting the first and second adjacent minute domains of the first alignment film, and wherein the second alignment film comprises a single layer of an alignment material including first and second, adjacent minute alignment film domains, said method further comprising rubbing and selectively irradiating the second alignment film with ultraviolet light so that the liquid crystal material respectively contacting the first and second adjacent minute domains of the second alignment film have pretilt angles $\alpha$ and $\gamma$ and so that the different pretilt angles of the first and second alignment films are opposed to each other.

34. A liquid crystal display device comprising:

a first plate having an alignment film;

a second plate opposed to the first plate and having an alignment film; and a liquid crystal disposed between the first and second plates;

the alignment film of at least the first plate comprising a single layer of alignment material having a plurality of first and second, adjacent minute domains;

the single layer of alignment material at the first and second, adjacent minute domains being rubbed; and the alignment film at one of the first and second, adjacent minute domains having an uneven surface.

35. A liquid crystal display device comprising:

a first plate having an alignment film thereon;

a second plate opposed to the first plate and having an alignment film thereon; and a liquid crystal disposed between the first and second alignment films and in contact therewith, the alignment film of the first plate comprising a single layer of an alignment material including first and second adjacent minute alignment film domains, the single layer of an alignment material being characterized by having been rubbed at the first and second domains, a surface of the single layer of alignment material being characterized by having been partially etched off at the first domain thereof, whereby a pretilt angle of the liquid crystal contacting said first alignment film at said first domain thereof is changed to be different than a pretilt angle of the liquid crystal contacting said first alignment film at said second domain thereof.

36. A liquid crystal display device comprising:

a first plate having an alignment film thereon;

a second plate opposed to the first plate and having an alignment film thereon;

a liquid crystal disposed between the first and second plates;

the alignment film of at least the first plate comprising a single layer of alignment material having a plurality of first and second, adjacent minute domains;

the single layer of alignment material at the first and second, adjacent minute domains being rubbed; and a hydrophobic material disposed between the first plate and the alignment layer.

37. A liquid crystal display device comprising:

a first plate having an alignment film thereon;

a second plate opposed to the first plate and having an alignment film thereon;

a liquid crystal material disposed between the first and second plates and in contact therewith, the alignment film of the first plate comprising a single layer of an alignment material having first and second adjacent minute alignment material domains, the single layer of alignment material being characterized by having been rubbed at said domains; and a substance capable of making the pretilt angle between the alignment material and the liquid crystal material provided on the single layer of alignment material at the first domain thereof different.

38. A liquid crystal display device comprising:

a first plate having an alignment film thereon;

a second plate opposed to the first plate and having an alignment film thereon;

a liquid crystal material disposed between the first and second plates and in contact therewith, the alignment film of the first plate comprising a single layer of an alignment material having first and second adjacent minute alignment material domains, the single layer of alignment material being characterized by having been rubbed at said domains; and a substance capable of changing the pretilt angle between the alignment material and the liquid crystal material provided on the single layer of alignment material at the first domain thereof, wherein the material capable of changing the pretilt angle has a property to align the liquid crystal in a perpendicular direction, relative to the surface of the first plate.

* * * * *

UNITED STATES PATENT AND TRADEMARK OFFICE
CERTIFICATE OF CORRECTION

PATENT NO.: 5,796,458
DATED : August 18, 1998
INVENTOR(S): Yoshio KOIKE et al.

It is certified that error appears in the above-identified patent and that said Letters Patent is hereby corrected as shown below:

Title Page, Foreign Patent Documents, change "63-267724" to --62-267724--.

Col. 4, line 44, change "views" to --view--.

Col. 6, line 31, after "18" insert --and particularly plate 16--;
line 32, delete "and particularly plate 16".

Col. 10, line 44, change "of" (second occurrence) to --on--.

Col. 12, line 40, delete "as".

Col. 16, line 66, after "possible" insert --to--.

Signed and Sealed this

Thirtieth Day of March, 1999

Attest:

Q. TODD DICKINSON

*Attesting Officer*    *Acting Commissioner of Patents and Trademarks*